US008521732B2

(12) United States Patent
Wood et al.

(10) Patent No.: US 8,521,732 B2
(45) Date of Patent: Aug. 27, 2013

(54) PRESENTATION OF AN EXTRACTED ARTIFACT BASED ON AN INDEXING TECHNIQUE

(75) Inventors: Matthew Scott Wood, Salt Lake City, UT (US); Paal Tveit, Salt Lake City, UT (US); Brian Edginton, West Jordan, UT (US); Steve Shillingford, Lindon, UT (US); James Brown, Lindon, UT (US); Joseph H Levy, Eagle Mountain, UT (US); Daniel M Arnold, Riverton, UT (US)

(73) Assignee: Solera Networks, Inc., South Jordan, UT (US)

( * ) Notice: Subject to any disclaimer, the term of this patent is extended or adjusted under 35 U.S.C. 154(b) by 346 days.

(21) Appl. No.: 12/471,433

(22) Filed: May 25, 2009

(65) Prior Publication Data

US 2009/0292681 A1 Nov. 26, 2009

Related U.S. Application Data

(60) Provisional application No. 61/055,873, filed on May 23, 2008.

(51) Int. Cl.
*G06F 7/00* (2006.01)
*G06F 17/30* (2006.01)

(52) U.S. Cl.
CPC .. *G06F 7/00* (2013.01); *G06F 17/30* (2013.01)
USPC ............ 707/731; 707/741; 707/758; 707/769

(58) Field of Classification Search
None
See application file for complete search history.

(56) References Cited

U.S. PATENT DOCUMENTS

| 5,274,643 A | 12/1993 | Fisk |
| 5,440,719 A | 8/1995 | Hanes et al. |
| 5,526,283 A | 6/1996 | Hershey et al. |
| 5,602,830 A | 2/1997 | Fichou et al. |
| 5,758,178 A | 5/1998 | Lesartre |
| 6,041,053 A | 3/2000 | Douceur et al. |
| 6,101,543 A | 8/2000 | Alden et al. |

(Continued)

FOREIGN PATENT DOCUMENTS

| EP | 0838930 A2 | 4/1998 |
| EP | 1004185 B1 | 5/2000 |

(Continued)

OTHER PUBLICATIONS

R. Fielding et al., "Hypertext Transfer Protocol—HTTP/1.1," Internet Engineering Task Force (IETF), Request for Comments (RFC) 2616, 2068, Network Working Group, 1999.*

(Continued)

*Primary Examiner* — Jay Morrison
(74) *Attorney, Agent, or Firm* — Cooley LLP

(57) ABSTRACT

A system and method of presentation of an extracted artifact based on an indexing technique are disclosed. In an embodiment, the method includes indexing a database of a captured network characteristic data using a processor and a memory to form an indexed capture data. The method includes enhancing a query response time with the indexed capture data. The method further includes searching the indexed capture data to generate a capture query result. The capture query result includes an extracted artifact. The method also includes graphically presenting the capture query result as at least one of an artifact list and an artifact image.

10 Claims, 22 Drawing Sheets

(56) References Cited

U.S. PATENT DOCUMENTS

| | | | |
|---|---|---|---|
| 6,145,108 | A | 11/2000 | Ketseoglou |
| 6,185,568 | B1 | 2/2001 | Douceur et al. |
| 6,336,117 | B1* | 1/2002 | Massarani .................. 707/711 |
| 6,370,622 | B1 | 4/2002 | Chiou et al. |
| 6,400,681 | B1 | 6/2002 | Bertin et al. |
| 6,453,345 | B2 | 9/2002 | Trcka et al. |
| 6,516,380 | B2 | 2/2003 | Kenchammana-Hoskote et al. |
| 6,522,629 | B1 | 2/2003 | Anderson, Sr. |
| 6,591,299 | B2 | 7/2003 | Riddle et al. |
| 6,628,617 | B1 | 9/2003 | Karol et al. |
| 6,628,652 | B1 | 9/2003 | Chrin et al. |
| 6,675,218 | B1 | 1/2004 | Mahler et al. |
| 6,693,909 | B1 | 2/2004 | Mo et al. |
| 6,708,292 | B1 | 3/2004 | Mangasarian |
| 6,754,202 | B1 | 6/2004 | Sun et al. |
| 6,782,444 | B1 | 8/2004 | Vishlitzky et al. |
| 6,789,125 | B1 | 9/2004 | Aviani et al. |
| 6,907,468 | B1 | 6/2005 | Moberg et al. |
| 6,907,520 | B2 | 6/2005 | Parady |
| 6,928,471 | B2 | 8/2005 | Pabari et al. |
| 6,956,820 | B2 | 10/2005 | Zhu et al. |
| 6,958,998 | B2 | 10/2005 | Shorey |
| 6,993,037 | B2 | 1/2006 | Boden et al. |
| 6,999,454 | B1 | 2/2006 | Crump |
| 7,002,926 | B1 | 2/2006 | Eneboe et al. |
| 7,024,609 | B2 | 4/2006 | Wolfgang et al. |
| 7,028,335 | B1 | 4/2006 | Borella et al. |
| 7,032,242 | B1 | 4/2006 | Grabelsky et al. |
| 7,039,018 | B2 | 5/2006 | Singh et al. |
| 7,047,297 | B2 | 5/2006 | Huntington et al. |
| 7,058,015 | B1 | 6/2006 | Wetherall et al. |
| 7,061,874 | B2 | 6/2006 | Merugu et al. |
| 7,065,482 | B2 | 6/2006 | Shorey et al. |
| 7,072,296 | B2 | 7/2006 | Turner et al. |
| 7,075,927 | B2 | 7/2006 | Mo et al. |
| 7,116,643 | B2 | 10/2006 | Huang et al. |
| 7,126,944 | B2 | 10/2006 | Rangarajan et al. |
| 7,126,954 | B2 | 10/2006 | Fang et al. |
| 7,142,507 | B1 | 11/2006 | Kurimoto et al. |
| 7,145,906 | B2 | 12/2006 | Fenner |
| 7,151,751 | B2 | 12/2006 | Tagami et al. |
| 7,154,896 | B1 | 12/2006 | Kim et al. |
| 7,162,649 | B1 | 1/2007 | Ide et al. |
| 7,168,078 | B1 | 1/2007 | Bar et al. |
| 7,200,122 | B2 | 4/2007 | Goringe et al. |
| 7,203,173 | B2 | 4/2007 | Bonney et al. |
| 7,218,632 | B1 | 5/2007 | Bechtolsheim et al. |
| 7,237,264 | B1 | 6/2007 | Graham et al. |
| 7,240,166 | B2 | 7/2007 | Ganfield |
| 7,254,562 | B2 | 8/2007 | Hsu et al. |
| 7,269,171 | B2 | 9/2007 | Poon et al. |
| 7,274,691 | B2 | 9/2007 | Rogers et al. |
| 7,277,399 | B1 | 10/2007 | Hughes, Jr. |
| 7,283,478 | B2 | 10/2007 | Barsheshet et al. |
| 7,292,591 | B2 | 11/2007 | Parker et al. |
| 7,330,888 | B2 | 2/2008 | Storry et al. |
| 7,340,776 | B2 | 3/2008 | Zobel et al. |
| 7,359,930 | B2 | 4/2008 | Jackson et al. |
| 7,376,731 | B2 | 5/2008 | Khan et al. |
| 7,376,969 | B1 | 5/2008 | Njemanze et al. |
| 7,379,426 | B2 | 5/2008 | Sekiguchi |
| 7,385,924 | B1 | 6/2008 | Riddle |
| 7,386,473 | B2 | 6/2008 | Blumenau |
| 7,391,769 | B2 | 6/2008 | Rajkumar et al. |
| 7,406,516 | B2 | 7/2008 | Davis et al. |
| 7,408,938 | B1 | 8/2008 | Chou et al. |
| 7,418,006 | B2 | 8/2008 | Damphier et al. |
| 7,420,992 | B1 | 9/2008 | Fang et al. |
| 7,423,979 | B2 | 9/2008 | Martin |
| 7,433,326 | B2 | 10/2008 | Desai et al. |
| 7,440,464 | B2 | 10/2008 | Kovacs |
| 7,441,267 | B1 | 10/2008 | Elliott |
| 7,444,679 | B2 | 10/2008 | Tarquini et al. |
| 7,450,560 | B2 | 11/2008 | Grabelsky et al. |
| 7,450,937 | B1 | 11/2008 | Claudatos et al. |
| 7,453,804 | B1 | 11/2008 | Feroz et al. |
| 7,457,277 | B1 | 11/2008 | Sharma et al. |
| 7,457,296 | B2 | 11/2008 | Kounavis et al. |
| 7,457,870 | B1 | 11/2008 | Lownsbrough et al. |
| 7,466,694 | B2 | 12/2008 | Xu et al. |
| 7,467,202 | B2 | 12/2008 | Savchuk |
| 7,480,238 | B2 | 1/2009 | Funk et al. |
| 7,480,255 | B2 | 1/2009 | Bettink |
| 7,483,424 | B2 | 1/2009 | Jain et al. |
| 7,489,635 | B2 | 2/2009 | Evans et al. |
| 7,493,654 | B2 | 2/2009 | Bantz et al. |
| 7,496,036 | B2 | 2/2009 | Olshefski |
| 7,496,097 | B2 | 2/2009 | Rao et al. |
| 7,499,590 | B2 | 3/2009 | Seeber |
| 7,508,764 | B2 | 3/2009 | Back et al. |
| 7,512,078 | B2 | 3/2009 | Swain et al. |
| 7,512,081 | B2 | 3/2009 | Ayyagari et al. |
| 7,522,499 | B2 | 4/2009 | Hosokawa et al. |
| 7,522,521 | B2 | 4/2009 | Bettink et al. |
| 7,522,594 | B2 | 4/2009 | Piche et al. |
| 7,522,599 | B1 | 4/2009 | Aggarwal et al. |
| 7,522,604 | B2 | 4/2009 | Hussain et al. |
| 7,522,605 | B2 | 4/2009 | Spencer et al. |
| 7,522,613 | B2 | 4/2009 | Rotsten et al. |
| 7,525,910 | B2 | 4/2009 | Wen |
| 7,525,963 | B2 | 4/2009 | Su et al. |
| 7,526,795 | B2 | 4/2009 | Rollins |
| 7,529,196 | B2 | 5/2009 | Basu et al. |
| 7,529,242 | B1 | 5/2009 | Lyle |
| 7,529,276 | B1 | 5/2009 | Ramakrishnan |
| 7,529,932 | B1 | 5/2009 | Haustein et al. |
| 7,529,939 | B2 | 5/2009 | Bruwer |
| 7,532,623 | B2 | 5/2009 | Rosenzweig et al. |
| 7,532,624 | B2 | 5/2009 | Ikegami et al. |
| 7,532,633 | B2 | 5/2009 | Rijsman |
| 7,532,726 | B2 | 5/2009 | Fukuoka et al. |
| 7,533,256 | B2 | 5/2009 | Walter et al. |
| 7,533,267 | B2 | 5/2009 | Yoshimura |
| 7,548,562 | B2 | 6/2009 | Ward et al. |
| 7,561,569 | B2 | 7/2009 | Thiede |
| 7,617,314 | B1 | 11/2009 | Bansod et al. |
| 7,684,347 | B2 | 3/2010 | Merkey et al. |
| 7,694,022 | B2 | 4/2010 | Garms et al. |
| 7,730,011 | B1 | 6/2010 | Deninger et al. |
| 7,792,818 | B2* | 9/2010 | Fain et al. ...................... 707/710 |
| 7,853,564 | B2* | 12/2010 | Mierau et al. ................. 707/638 |
| 7,855,974 | B2 | 12/2010 | Merkey et al. |
| 7,881,291 | B2 | 2/2011 | Grah |
| 7,904,726 | B2 | 3/2011 | Elgezabal |
| 8,068,431 | B2 | 11/2011 | Varadarajan et al. |
| 2001/0039579 | A1 | 11/2001 | Trcka et al. |
| 2002/0085507 | A1 | 7/2002 | Ku et al. |
| 2002/0089937 | A1 | 7/2002 | Venkatachary et al. |
| 2002/0091915 | A1 | 7/2002 | Parady |
| 2002/0100952 | A1 | 8/2002 | Hong |
| 2002/0138654 | A1 | 9/2002 | Liu et al. |
| 2002/0163913 | A1 | 11/2002 | Oh |
| 2002/0173857 | A1 | 11/2002 | Pabari et al. |
| 2002/0191549 | A1 | 12/2002 | McKinley et al. |
| 2003/0009718 | A1 | 1/2003 | Wolfgang et al. |
| 2003/0014517 | A1 | 1/2003 | Lindsay et al. |
| 2003/0088788 | A1 | 5/2003 | Yang |
| 2003/0135525 | A1 | 7/2003 | Huntington |
| 2003/0135612 | A1 | 7/2003 | Huntington et al. |
| 2003/0188106 | A1* | 10/2003 | Cohen ............................ 711/133 |
| 2003/0214913 | A1 | 11/2003 | Kan et al. |
| 2003/0221003 | A1 | 11/2003 | Storry et al. |
| 2003/0231632 | A1 | 12/2003 | Haeberlen |
| 2003/0233455 | A1 | 12/2003 | Leber et al. |
| 2004/0010473 | A1 | 1/2004 | Hsu et al. |
| 2004/0078292 | A1 | 4/2004 | Blumenau |
| 2004/0100952 | A1 | 5/2004 | Boucher et al. |
| 2004/0103211 | A1 | 5/2004 | Jackson et al. |
| 2004/0218631 | A1 | 11/2004 | Ganfield |
| 2004/0260682 | A1 | 12/2004 | Herley et al. |
| 2005/0015547 | A1 | 1/2005 | Yokohata et al. |
| 2005/0050028 | A1* | 3/2005 | Rose et al. ...................... 707/3 |
| 2005/0055399 | A1 | 3/2005 | Savchuk |
| 2005/0063320 | A1 | 3/2005 | Klotz et al. |

| | | | |
|---|---|---|---|
| 2005/0083844 A1 | 4/2005 | Zhu et al. | |
| 2005/0108573 A1 | 5/2005 | Bennett et al. | |
| 2005/0117513 A1 | 6/2005 | Park et al. | |
| 2005/0132046 A1 | 6/2005 | de la Iglesia et al. | |
| 2005/0132079 A1 | 6/2005 | Iglesia et al. | |
| 2005/0207412 A1 | 9/2005 | Kawashima et al. | |
| 2005/0229255 A1 | 10/2005 | Gula et al. | |
| 2005/0249125 A1 | 11/2005 | Yoon et al. | |
| 2005/0265248 A1 | 12/2005 | Gallatin et al. | |
| 2006/0013222 A1 | 1/2006 | Rangan et al. | |
| 2006/0037072 A1 | 2/2006 | Rao et al. | |
| 2006/0069821 A1 | 3/2006 | P et al. | |
| 2006/0083180 A1 | 4/2006 | Baba et al. | |
| 2006/0088040 A1 | 4/2006 | Kramer et al. | |
| 2006/0114842 A1 | 6/2006 | Miyamoto et al. | |
| 2006/0126665 A1 | 6/2006 | Ward et al. | |
| 2006/0146816 A1 | 7/2006 | Jain | |
| 2006/0165009 A1 | 7/2006 | Nguyen et al. | |
| 2006/0165052 A1 | 7/2006 | Dini et al. | |
| 2006/0167894 A1 | 7/2006 | Wunner | |
| 2006/0168240 A1 | 7/2006 | Olshefski | |
| 2006/0203848 A1 | 9/2006 | Damphier et al. | |
| 2006/0221967 A1 | 10/2006 | Narayan et al. | |
| 2006/0233118 A1 | 10/2006 | Funk et al. | |
| 2006/0235908 A1 | 10/2006 | Armangau et al. | |
| 2007/0019640 A1 | 1/2007 | Thiede | |
| 2007/0036156 A1 | 2/2007 | Liu et al. | |
| 2007/0038665 A1* | 2/2007 | Kwak et al. | 707/102 |
| 2007/0050334 A1 | 3/2007 | Deninger et al. | |
| 2007/0050465 A1 | 3/2007 | Canter et al. | |
| 2007/0058631 A1 | 3/2007 | Mortier et al. | |
| 2007/0124276 A1* | 5/2007 | Weissman et al. | 707/2 |
| 2007/0139231 A1 | 6/2007 | Wallia et al. | |
| 2007/0140235 A1 | 6/2007 | Aysan et al. | |
| 2007/0140295 A1 | 6/2007 | Akaboshi | |
| 2007/0147263 A1 | 6/2007 | Liao et al. | |
| 2007/0153796 A1 | 7/2007 | Kesavan et al. | |
| 2007/0157306 A1 | 7/2007 | Elrod et al. | |
| 2007/0162609 A1 | 7/2007 | Pope et al. | |
| 2007/0162971 A1 | 7/2007 | Blom et al. | |
| 2007/0248029 A1 | 10/2007 | Merkey et al. | |
| 2007/0250817 A1* | 10/2007 | Boney | 717/124 |
| 2007/0271372 A1 | 11/2007 | Deninger et al. | |
| 2007/0286175 A1 | 12/2007 | Xu et al. | |
| 2007/0291755 A1 | 12/2007 | Cheng et al. | |
| 2007/0291757 A1 | 12/2007 | Dobson et al. | |
| 2007/0297349 A1 | 12/2007 | Arkin | |
| 2008/0013541 A1 | 1/2008 | Calvignac et al. | |
| 2008/0037539 A1 | 2/2008 | Paramaguru | |
| 2008/0056144 A1 | 3/2008 | Hutchinson et al. | |
| 2008/0117903 A1 | 5/2008 | Uysal | |
| 2008/0159146 A1 | 7/2008 | Claudatos et al. | |
| 2008/0175167 A1 | 7/2008 | Satyanarayanan et al. | |
| 2008/0240128 A1 | 10/2008 | Elrod | |
| 2008/0247313 A1 | 10/2008 | Nath et al. | |
| 2008/0279216 A1 | 11/2008 | Sharif-Ahmadi et al. | |
| 2008/0294647 A1 | 11/2008 | Ramaswamy | |
| 2009/0003363 A1 | 1/2009 | Benco et al. | |
| 2009/0006672 A1 | 1/2009 | Blumrich et al. | |
| 2009/0028161 A1 | 1/2009 | Fullarton et al. | |
| 2009/0028169 A1 | 1/2009 | Bear et al. | |
| 2009/0041039 A1 | 2/2009 | Bear et al. | |
| 2009/0073895 A1 | 3/2009 | Morgan et al. | |
| 2009/0092057 A1 | 4/2009 | Doctor et al. | |
| 2009/0097417 A1 | 4/2009 | Asati et al. | |
| 2009/0097418 A1 | 4/2009 | Castillo et al. | |
| 2009/0103531 A1 | 4/2009 | Katis et al. | |
| 2009/0109875 A1 | 4/2009 | Kaneda et al. | |
| 2009/0113217 A1 | 4/2009 | Dolgunov et al. | |
| 2009/0116403 A1 | 5/2009 | Callanan et al. | |
| 2009/0116470 A1 | 5/2009 | Berggren | |
| 2009/0119501 A1 | 5/2009 | Petersen | |
| 2009/0122801 A1 | 5/2009 | Chang | |
| 2009/0132516 A1* | 5/2009 | Patel et al. | 707/5 |
| 2009/0168648 A1 | 7/2009 | Labovitz et al. | |
| 2009/0182953 A1 | 7/2009 | Merkey et al. | |
| 2009/0187558 A1 | 7/2009 | McDonald | |
| 2009/0219829 A1 | 9/2009 | Merkey et al. | |
| 2009/0245114 A1 | 10/2009 | Vijayaraghavan | |
| 2009/0290580 A1 | 11/2009 | Wood et al. | |
| 2009/0292681 A1 | 11/2009 | Wood et al. | |
| 2010/0278052 A1 | 11/2010 | Matityahu et al. | |

FOREIGN PATENT DOCUMENTS

| | | | |
|---|---|---|---|
| EP | 1387527 A1 | 2/2004 | |
| EP | 1494425 A1 | 1/2005 | |
| EP | 1715627 A1 | 10/2006 | |
| EP | 1971087 A1 | 9/2008 | |
| GB | 2337903 A | 12/1999 | |
| JP | 2002026935 A | 1/2002 | |
| JP | 2002064507 A | 2/2002 | |
| JP | 2002323959 A | 11/2002 | |
| KR | 20060034581 A | 4/2006 | |
| WO | WO 02/23805 A2 | 3/2002 | |
| WO | WO 2005/109754 A1 | 11/2005 | |
| WO | WO 2009/038384 A1 | 3/2009 | |

OTHER PUBLICATIONS

Berners-Lee et al., "Hypertext Transfer Protocol—HTTP/1.0," IETF, RFC 1945, Network Working Group, 1996.*

Huang, M., Bavier, A., and Peterson, L., PlanetFlow: Maintaining Accountability for Network Services, ACM SIGOPS Operating Systems Review 40, 1 (Jan. 2006).*

Hamill et al., "Petaminer: Efficient Navigation to Petascale Data Using Event-Level Metadata", Proceedings of XII Advanced Computing and Analysis Techniques in Physics Research, Nov. 2008, pp. 1-5.

Kim, Kwang Sik (Exr), International Search Report issued to application No. PCT/US09/41061, Nov. 26, 2009, 8 pgs.

Kim, Sae Young (Exr), International Search Report issued to application No. PCT/US09/41060, Dec. 3, 2009, 8 pgs.

Kwon, Oh Seong (Exr), International Search Report issued to application No. PCT/US09/40733, Nov. 24, 2009, 3 pgs.

Lupia, Sergio (Exr), International Search Report issued to application No. PCT/US10/56739, Apr. 1, 2011, 15 pgs.

Lupia, Sergio (Exr), International Search Report issued to application No. PCT/US10/56723, Apr. 20, 2011, 14 pgs.

Stockinger, "Network Traffic Analysis with Query Driven Visualization—SC2005 HPC Analytics Results", Proceedings of the 2005 ACM/IEEE SC/05 Conference, Nov. 2005, 4 pgs.

* cited by examiner

ADVANCED SEARCH ~ 602

ADVANCED SEARCH

ALL OF THESE WORDS "EXACT PHRASE" AT OR LEAST OR ONE OF OR THESE OR WORDS -NONE -OF -THESE -WORDS WITHIN:1D INTERFACE:ETH1
USER:192.168.2.152 SITE:GOOGLE.COM FROM:WEB FILE TYPE:WEB, EMAIL

MY SAVED SEARCHES | SELECT....
604
⊖ DELETE  ⇄ UPDATE  🔍 SEARCH

606

INCLUDES ARTIFACTS WITH...
608
- ALL OF THESE WORDS: ALL OF THESE WORDS
- THIS EXACT PHRASE: EXACT PHRASE
- AT LEAST 1 OF THESE WORDS: AT LEAST ONE OF THESE WORDS
- NONE OF THESE WORDS: NONE OF THESE WORDS

INCLUDES ARTIFACTS CAPTURED...
610
- WITHIN THE PAST: DAY
- BY INTERFACE: ETH1
- FROM USER OR IP: 192.168.2.152
- FROM DOMAIN OR IP: GOOGLE.COM

○ SEARCH ALL
⦿ WEB BROWSING
○ EMAIL
○ INSTANT MESSAGING
○ VOICE OVER IP
○ TELNET SESSIONS
○ FTP SESSIONS
○ OTHER

RESULT PREFERENCES...
612
- ARTIFACTS PER PAGE: 10 ARTIFACTS
- LIMIT TO ARTIFACT FILE TYPE:
  - WEB PAGES
  - EMAIL MESSAGES (EML)
  - MICROSOFT OFFICE FILE (XLS PPT DOC)
  - ADOBE ACROBAT (PDF)
  - IMAGES (JPG PNG BMP)
  - AUDIO (WAV RA)

SEARCH EMAILS FOR...
614
- FROM:
- TO:
- SUBJECT:
- ATTACHMENTS
- ☐ INCLUDE ONLY EMAIL MESSAGES WITH ATTACHMENTS

🔍 SET UP SEARCH NOTIFICATIONS     CANCEL     ADVANCED SEARCH

ADD TO SAVED SEARCHES

THUMBNAIL IMAGES OF
SCREENSHOTS 1000

PRESENTATION OF AN EXTRACTED ARTIFACT BASED ON AN INDEXING TECHNIQUE

CLAIM OF PRIORITY

This application claims the benefit of U.S. Provisional Application No. 61/055,873, filed on May 23, 2008.

FIELD OF TECHNOLOGY

This disclosure relates generally to technical fields of software and, in one example embodiment, presentation of an extracted artifact based on an indexing technique.

BACKGROUND

A database of information acquired through monitoring network traffic may include multiple files, programs, and data types. A user may lack sufficient skill or information to formulate a query to search the database effectively. In addition, each search of the database may consume a significant amount of time. The use of the significant amount of time may deter a user from developing a complete query or a thorough set of queries. The user may be encouraged to take shortcuts in generating a query. As a result, the quality of a query generated by a user and/or a number of queries may be limited, and a desired information may be unavailable.

SUMMARY

A system and method of presentation of an extracted artifact based on an indexing technique are disclosed. In an aspect, a method includes indexing a database of a captured network characteristic data using a processor and a memory to form an indexed capture data. The method also includes enhancing a query response time with the indexed capture data. The method further includes searching the indexed capture data to generate a capture query result. The capture query result includes an extracted artifact. In addition, the method includes graphically presenting the capture query result as at least one of an artifact list and an artifact image.

The method may include aggregating a payload data from different network packets. The method may also include matching the payload data with an entry of library of known artifacts. The method may also include determining a type of the payload data based on a match with the entry of the library of known artifacts. The method may further include separating the payload data from a header data in a network packet and acquiring the extracted artifact from a network traffic.

The method may also include analyzing one or more of a data content, a file content, a file name, a directory name, a file metadata, and an extracted artifact when the database of the captured network characteristic data is indexed. The method may also include discovering an event comprised of at least one of an initial installation, a user command, and an indexing time period. The method may include, responsive to the event, indexing the database of the captured network characteristic data. Indexing the database of the captured network characteristic data is performed locally.

The method may include providing a visual user option through a graphical user interface. The visual user option includes a user selectable query parameter determined by one or more of a radio button, a pull-down menu, a check box, a check list, a button, and a selectable image. The method also includes presenting a customizable query box through the graphical user interface. The method may also include receiving a selection based on at least one of the visual user option and the customizable query box. The method may include generating a search parameter based on the selection.

The method may further include graphically presenting the capture query result through a web browser when the capture query result is received. In addition, the method may include reconstructing an artifact image of the extracted artifact using a virtual client application and acquiring a snapshot of the artifact image. The method may include forming a thumbnail view of the snapshot and displaying the thumbnail view through a graphical user interface. The virtual client application may include a virtual web browser. The extracted artifact may include one or more of a word processing document, a spreadsheet document, a database, an image, a video, a multimedia file, an email, an instant message communication, an audio file, a compressed file, an executable file, a web page, a presentation, a program file, and a data package.

In another aspect, a system includes a processor to index a database of a captured network characteristic data using a memory to form an indexed capture data. A query response time is enhanced through the indexed capture data. The system includes a field module to search the indexed capture data to generate a capture query result. The capture query result includes an extracted artifact. The system further includes a graphical user interface module to present the capture query result as at least one of an artifact list and an artifact image.

The system may include an additional processor to aggregate a payload data from different network packets. The system may further include a database to store a library of known artifacts, wherein the additional processor and the database are used to match the payload data with an entry of library of known artifacts, determine a type of the payload data based on a match with the entry of the library of known artifacts, and separate payload data from a header data in a network packet. The system may also include an additional memory to acquire the extracted artifact from a network traffic.

The system may further include a network characteristic database to store the extracted artifact. The system may also include an index module to analyze at least one of a data content, a file content, a file name, a directory name, a file metadata, and an extracted artifact when the database of the captured network characteristic data is indexed. The system may include a network characteristic database index module to store a result of an index module analysis.

The system may include a network visibility module to discover an event comprised of at least one of an initial installation, a user command, and an indexing time period, wherein responsive to the event, the database of the captured network characteristic data is indexed using the index module and the processor. Indexing the database of the captured network characteristic data may be performed by a desktop computer communicatively coupled to the network characteristic database and a network characteristic database index.

The system may further include a criteria module to generate a search parameter using at least one of a visual user option and a customizable query box. The visual user option may be comprised of a user selectable query parameter determined by at least one of a radio button, a pull-down menu, a check box, a check list, a button, and a selectable image. The system may include a web browser to graphically presenting the capture query result when the capture query result is received.

In yet another aspect, a method includes aggregating a payload data from different network packets. The method also includes matching the payload data with an entry of library of known artifacts. The method further includes determining a type of the payload data based on a match with the entry of the library of known artifacts. The method also includes separating the payload data from a header data in a network packet and acquiring an extracted artifact from a network traffic. The method also includes storing the extracted artifact in a database of a captured network characteristic data. The method further includes analyzing at least one of a data content, a file content, a file name, a directory name, a file metadata, and an extracted artifact when the database of the captured network characteristic data is indexed.

In the aspect, the method also includes discovering an event comprised of at least one of an initial installation, a user command, and an indexing time period. The method also includes, responsive to the event, indexing the database of the captured network characteristic data using a processor and a memory of a desktop computer communicatively coupled to a network characteristic database and the network characteristic database index. The method also includes enhancing a query response time with an indexed capture data and searching the indexed capture data to generate a capture query result. The capture query result may include an extracted artifact. The method also includes graphically presenting the capture query result as at least one of an artifact list and an artifact image.

The method may include providing a visual user option through a graphical user interface. The visual user option may include a user selectable query parameter determined by at least one of a radio button, a pull-down menu, a check box, a check list, a button, and a selectable image. The method may further include presenting a customizable query box through the graphical user interface. The method may also include receiving a selection based on at least one of the visual user option and the customizable query box. The method may also include generating a search parameter based on the selection. The method may include reconstructing an artifact image of the extracted artifact using a virtual client application. The method may include acquiring a snapshot of the artifact image, forming a thumbnail view of the snapshot, and displaying the thumbnail view through a web browser when the capture query result is received.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the Figures of the accompanying drawings, in which like references indicate similar elements and in which:

FIGS. 6-12 are example views of user interfaces, according to various embodiments.

Other features of the present embodiments will be apparent from the accompanying Drawings and from the Detailed Description that follows.

DETAILED DESCRIPTION

A system and method of presentation of an extracted artifact based on an indexing technique are disclosed. In the following description, for the purposes of explanation, numerous specific details are set forth in order to provide a thorough understanding of the various embodiments. It may be evident, however, to one skilled in the art that the various embodiments may be practiced without these specific details.

Figure 1:
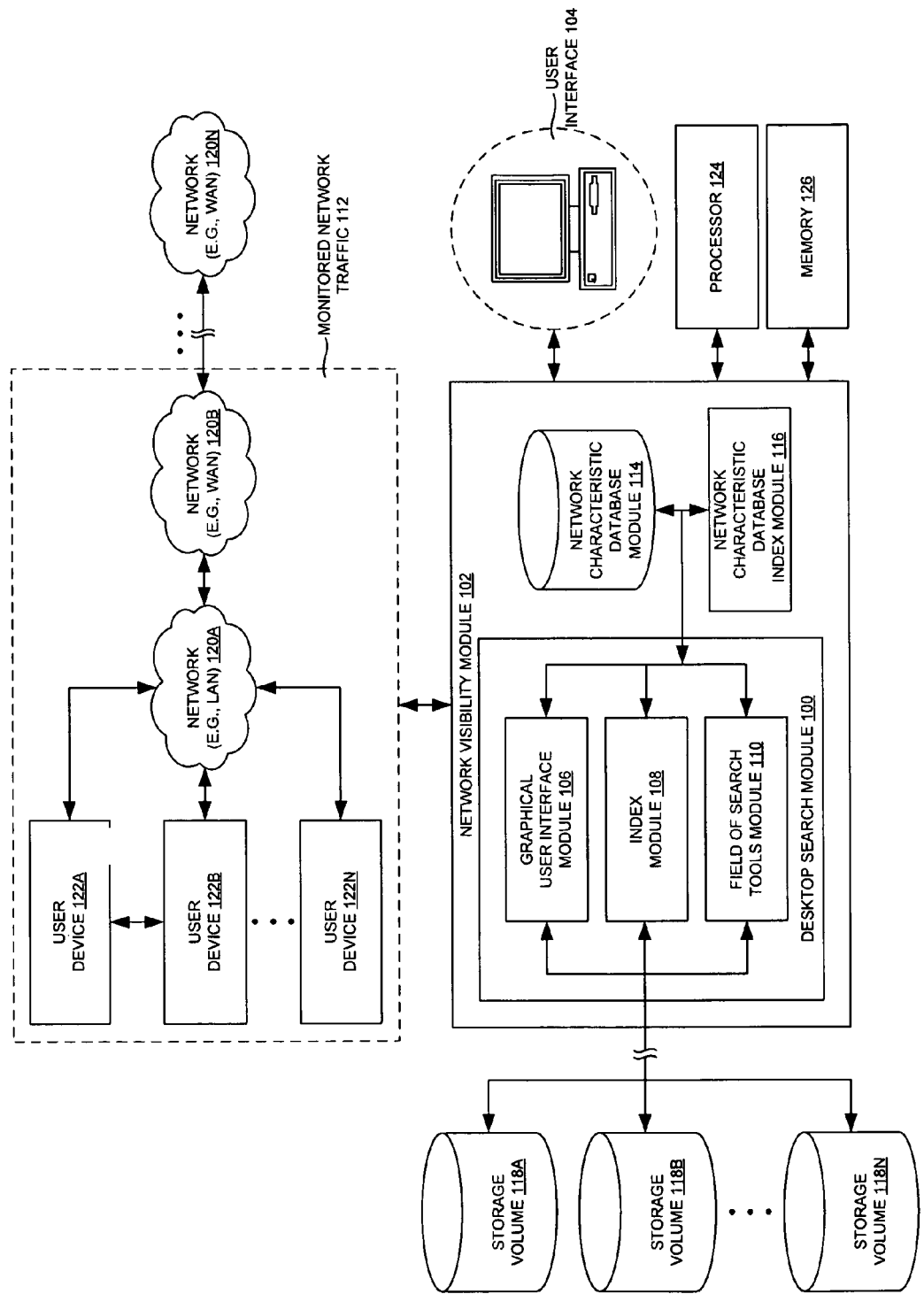
FIG. 1 is a system view illustrating a data communication between monitored network traffic, a network visibility module, and a desktop search module, according to one embodiment.

FIG. 1 is a system view illustrating a data communication between monitored network traffic 112, a network visibility module 102, and a desktop search module 100, according to one embodiment. Particularly, FIG. 1 illustrates a desktop search module 100, a network visibility module 102, a user interface 104, a graphical user interface module 106, an index module 108, a field module 110, a monitored network traffic 112, a network characteristic database module 114, a network characteristic database index module 116, a storage volume 118A-N, a network 120A-N, a user device 122A-N, a processor 124, and a memory 126, according to one embodiment.

In an example embodiment, FIG. 1 may illustrate the flow of data in the network 120A-N that may be monitored by the network visibility module 102. The storage volume 118A-N may communicate with the network visibility module 102. The user device 122A-N may include a data processing unit that communicates with the other devices in the network 120A-N. The network 120A-N (e.g., LAN, WAN, mobile, telecommunications, internet, intranet, Bluetooth, WiFi, WiMax, and/or ZigBee network, etc.) may enable communication between the user device 122A-N and other devices.

The network visibility module 102 may access, acquire, and store information included within the monitored network traffic 112. The network visibility module 102 may be a hardware and/or software application that stores captured data transmitted through a computer network, such as the network 120A-N. The information may be stored within the storage volumes 118A-N, and the information may include one or more extracted artifacts 234 acquired from the monitored network traffic 112. The network visibility module 102 may store the data in the network characteristic database module 114.

In an embodiment, the extracted artifact 234 may be acquired from network traffic by aggregating a payload data from different network packets. The payload data may be matched with an entry of a library of known artifacts. A type of the payload data may be determined based on a match with the entry of the library of known artifacts. The payload data may be separated from the header data in a network packet.

In the embodiment, an extracted artifact may include a word processing document, a spreadsheet document, a database, an image, a video, a multimedia file, an email, an instant message communication, an audio file, a compressed file, an executable file, a web page, a presentation, a program file, and a data package. The extracted artifact may include any file type, raw data, or other information communicated through a network.

In an embodiment, the desktop search module 100 may index a database of a captured network characteristic data using the processor 124 and the memory 126 to enhance a query response time and to form an indexed capture data stored within the network characteristic database index module 116, according to one embodiment. The desktop search module 100 may use the index module 108 to search and/or generate the database index for the relevant content of the user's search. The index module 108 may operate in conjunction with an artifact index module 340 and/or file index module 342 to search, build and/or maintain an index database of network data. Building an index of the captured network data may improve a search response speed in comparison to a direct search of stored data.

After the initial indexing is completed, the desktop search module 100 may continue to index files as needed, such as when a user command is received or on a periodic and/or continuous basis. An indexing time period may be a time delay after which an indexing operation is performed and/or a time period determined using an algorithm. Indexing may also be suspended for a specified period of time.

The user may start searching for files immediately after installing the desktop search module 100. After performing searches, results may also be returned in an Internet browser on the Google® Desktop Home Page much like the results for Google® Web searches. When indexing the data, the artifact and/or the file, the desktop search module 100 may collect types of information about the data, the artifact and/or the file (e.g., file and directory names, metadata, data content, file contents, titles, authors, comments in file types such as Mp3, PDF and JPEG documents, extracted artifacts, etc.). The desktop search module 100 may index several different types of data, including email, web browsing history (e.g., Internet Explorer, Mozilla Firefox, etc.), office documents (e.g., in the Open Document and Microsoft Office® formats), instant messenger transcripts (e.g., from AOL®, Google®, MSN®, Skype®, Tencent QQ, etc.) and several multimedia file types for enabling a user to search the data faster. Additional file types may be indexed through the use of plug-ins (e.g., an auxiliary computer program). The desktop search module 100 may allow the user to control which types of data (e.g., artifacts and/or files) are indexed by the program.

Indexing may be performed locally, such as on a desktop computer of a particular user, on a laptop, on a mobile device, in a client device, or with respect to a particular virtual machine. Indexing may therefore be associated with a particular user, machine, and/or entity. In an embodiment, indexing may be performed locally using hardware and/or software associated with a particular network that is separate from a monitored network. Indexing locally may also refer to performing an indexing operation using cloud computing resources that are separate from those of a monitored network. Indexing may also be performed within a monitored network, using resources, storage devices, memory, and processors of the monitored network.

The desktop search module 100 may utilize the field module 110 to search the contents of the computer files and/or data that may be stored in the network characteristic database module 114 and/or indexed in the network characteristic database index module 116. The field module 110 may conduct a search based on a set of network traffic characteristics, which may include web browser histories, e-mail archives, text documents, sound files, images and/or video. The desktop search module 100 may include the ability to search the contents of image files, sound files and video by context. In an embodiment, the indexed capture data is searched to generate a capture query result 236 that includes an extracted artifact. After initial installation, the desktop search module 100 may complete an indexing of all the data, artifacts and files in the network characteristic database module 114 and/or storage volumes 118A-N (e.g., data stored in raw form in the network characteristic database module 114 and/or data indexed by the network characteristic database index module 116). The indexing may include the content of the file and/or the file name.

The field module 110 may conduct a search based on a particular string of data found within a file (e.g., a particular word or phrase in a Microsoft Word® document or an email). The set of network characteristics searched for may include a source and destination of addresses, a source and destination of port, and/or a port protocol network interface. The set of characteristics may be extensible and include other elements. To search within documents, the field module 110 may parse many different types of artifacts and/or files (e.g., a word processor program file). This may be achieved by using a set of filters that may interpret selected file formats (e.g., using the filter module 346 of FIG. 3). For example, a Microsoft Office® Filter may search inside Microsoft Office® documents.

The graphical user interface module 106 may provide real-time control in a separate program in order to reduce or limit the need to refresh an HTML based web browser. The graphical user interface module 106 may use a multi-screen interface (e.g., an interface that may employ a set of multiple displays to provide a flexible interaction).

The graphical user interface module 106 may enable generation of a search parameter using one or more of a visual user option and a customizable query box. The visual user option may be a radio button, a pull-down menu, a check box, a check list, a button, or a selectable image. The customizable query box may display a query generated by a user's selection of a visual user option. The customizable query box may allow a user to directly enter a query.

The graphical user interface module 106 may graphically present the capture query result as an artifact list and/or an artifact image. The artifact list may be a text based description of extracted artifacts that were located, and the artifact image may be a graphic representation of the type of artifact located based on a software type and/or the contents of the extracted artifact. Additional examples of the graphical user interface may be better understood from FIGS. 6-12.

In an embodiment, the capture query result may include an extracted artifact that is reconstructed using a virtual client application to be presented using the graphical user interface module 106. For example, a web page may include images, html code, javascript, flash animation, and/or text. A virtual web browser may be used to interpret the extracted artifact of the capture query result and to reconstruct the web page as it would appear to a client side application based on the captured data.

The artifact image may be a snapshot of the appearance of the webpage based on the data that was captured from network traffic. The snapshot may be taken at a particular time that the information was accessed, or it may be derived from the information that was monitored and captured. The snapshot may be an algorithmically selected time period to present a representative image based on the content of different parts of the image. For example, a portion of a video may be selected to illustrate action, text, particular colors, trademark names, or information corresponding to individuals or confidential information. A flash animation image may be chosen based on a selected time period after a beginning. An audio clip may be presented as a media icon that allows all or a portion of the captured content to be played.

The artifact image may be a thumbnail image of the captured content, and the graphical user display may illustrate a table view of multiple images that were captured. The artifact image may be interactive based on a user's interaction with the artifact image, nearby images, and/or other artifact images that are determined to be related to the artifact images. For example, a user may use a pointer to point at different artifact images or parts of the artifact images. The graphical user interface may respond by expanding the artifact image and/or allowing the user to access the artifact image and/or related content, such as text and/or audio files that were captured as part of the monitored network traffic. The graphical user interface may allow a user to choose to view a webpage based on the extracted artifact and/or the current data presented by the webpage.

The order of artifact images presented by the graphical user interface may be temporal, sorted by relevance to a query, organized by similarity to other artifact images, and/or any other order. An example of an artifact image presented using a graphical user interface may be illustrated in FIG. 10.

The graphical user interface may display query building options, capture query results, extracted artifacts, and/or reconstructed visual images to a user through the user interface 104.

Figure 2:
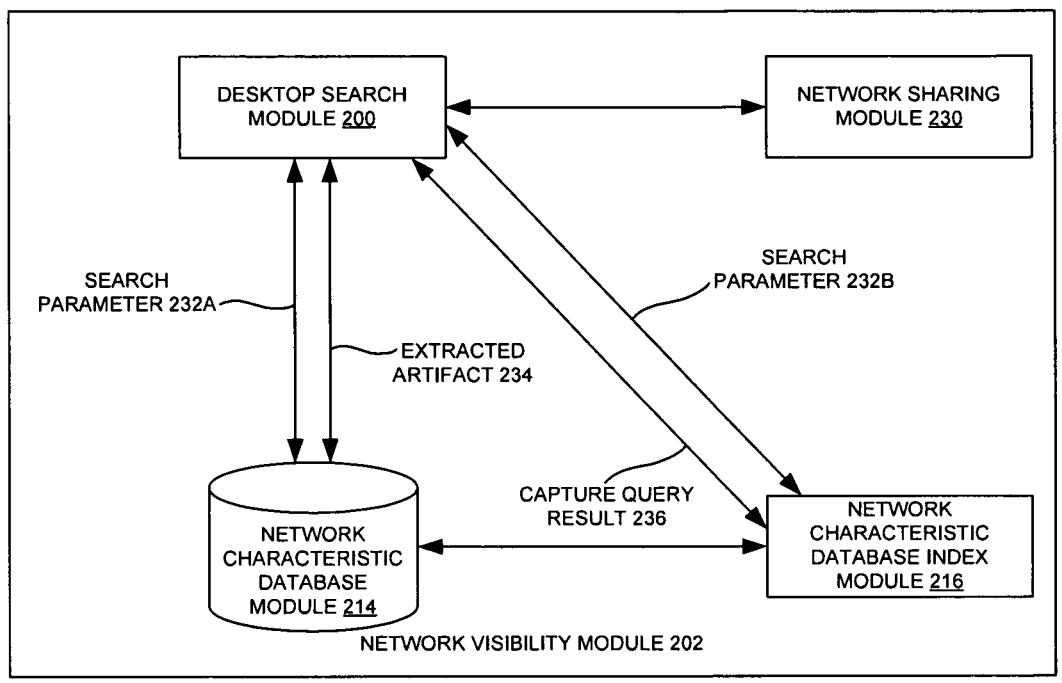
FIG. 2 is an exploded view of the network visibility module of FIG. 1, according to one embodiment.

FIG. 2 is an exploded view of the network visibility module 102 of FIG. 1, according to one embodiment. Particularly, FIG. 2 illustrates a desktop search module 200, a network characteristic database module 214, a network characteristic database index module 216, a network sharing module 230, a search parameter 232A-B, an extracted artifact 234, and a capture query result 236, according to one embodiment.

The desktop search module 200 may index several different types of data, including email, web browsing history (e.g., Internet Explorer, Mozilla Firefox, etc.), office documents (e.g., Open Document, Microsoft Office®, etc.), instant messenger transcripts (e.g., from AOL®, Google®, MSN®, Skype®, Tencent QQ, etc.) and several multimedia file types. Additional file types may be indexed through the use of plug-ins (e.g., an auxiliary computer program). The desktop search module 200 may allow the user to control types of data (e.g., artifacts and/or files) that are indexed by the program.

The network sharing module 230 may share the artifacts and/or other different types of files that may be flowing over the different networks. The network characteristic database module 214 may store the captured data locally and/or a separate storage volume (e.g., storage volumes 118A-N of FIG. 1). The network characteristic database index module 216 may be a database of an index of network traffic characteristics.

In an example embodiment, the desktop search module 200 may communicate with the network characteristic database index module 216, the network sharing module 230 and with network characteristic database module 214 to fetch the data stored in the database (e.g., the source and the destination addresses, source and destination ports, files and artifacts extracted from the network traffic etc.).

The search parameter 232A may be generated using a query generated by the graphical user interface module 106 and/or the field module 110, and it may be used to search the network characteristic database module 214. The search parameter 232B may be generated using a query generated by the graphical user interface module 106 and/or the field module 110 to search the network characteristic database index module 216.

Figure 3:
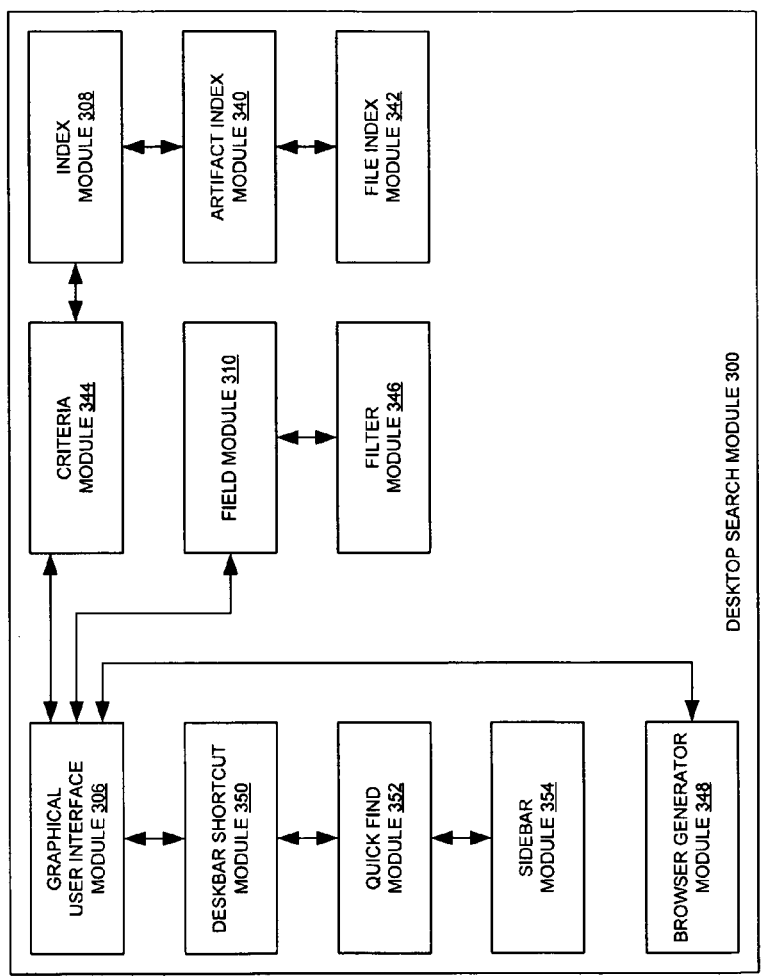
FIG. 3 is an exploded view of desktop search module of FIG. 2, according to one embodiment.

FIG. 3 is an exploded view of the desktop search module 100 of FIG. 1, according to one embodiment. Particularly, FIG. 3 illustrates a desktop search module 300, a graphical user interface module 306, an index module 308, a field module 110, an artifact index module 340, a file index module 342, a criteria module 344, a filter module 346, a browser generator module 348, a deskbar shortcut module 350, a quick find module 352, and a sidebar module 354, according to one embodiment.

In an example embodiment, the graphical user interface module 306 may communicate with the deskbar shortcut module 350, the criteria module 344, the fields of search tools module 310, and the browser generator module 348. The quick find module 352 may communicate with the deskbar shortcut module 350 and the sidebar module 354. The criteria module 344 may communicate with the index module 308. The artifact index module 340 may communicate with the index module 308 and the file index module 342. The filter module 346 may communicate with the field module 310.

The desktop search module 300 may include a browser generator module 348. The browser generator module 348 may accept input and provide output by generating a web page which may be transmitted via a computer network (e.g., the Internet) and viewed by the user using a web browser program (e.g., Java®, AJAX®, Adobe® Hex, Microsoft .NET®, etc.).

The desktop search module 300 may include a sidebar module 354. The sidebar may display various forms of information to the side of an application or desktop user interface. The sidebar may hold several common gadgets and resides off to one side of a desktop of a graphical user interface generated using a graphical user interface module 306. The sidebar module may be available with the Microsoft Windows version of Google Desktop. Another feature of the sidebar module may be an alert function that may automatically alert a user when a specified type of network artifact is observed and/or stored by the network visibility module.

The desktop search module 300 may include a quick find application (e.g., quick find module 352 of FIG. 3). The quick find application may generate a quick find window on the graphical user interface. The quick find window may be filled with specified number of relevant results from a search which may assist with obtaining a desired network information without opening another browser window.

The desktop search module 300 may include a deskbar (e.g., the deskbar shortcut module 350 of FIG. 3). The deskbar shortcut module 350 may generate a set of deskbars (e.g., illustrative example of a deskbar in FIG. 10). A deskbar may be a box which may enable the user to type in a search query directly from a user's desktop. A Web result may open in a browser window, and selected computer results may be displayed in the quick find box. A deskbar may be a fixed deskbar, which sits in a Windows taskbar, and/or a floating deskbar, which the user may position anywhere on the user's desktop.

The deskbar shortcut module 350 may include a capability to create an application which may be a short string set to open a set of different applications. The quick find module 352 may include a quick find application that update the user as the user types such that the user may obtain desired network information without having to open another browser window. The criteria module 344 may provide the user (e.g., may include the network administrator) various search criteria to find a document in a form of a questionnaire.

The desktop search module may include a set of plugins that allow the user to index and search through the contents of a computer application (e.g., local Microsoft Outlook®, IBM Lotus Notes®, and Mozilla Thunderbird® email databases, etc.). These databases may be outside of the user's applications' built-in search functions. The desktop search module's email indexing feature may also be integrated with a web-based email service (e.g., Gmail®). The desktop search module may be able to index and search the email messages in an email account of a network user.

The desktop search module 300 may use a Google® desktop search software made by Google® for Mac OS X®, Linux®, and Microsoft Windows®. The program may allow text searches (e.g., a text search of a set of e-mails, computer files, music, photos, chats, and Web pages) transmitted through the network monitored by the network visibility module. The Google® desktop search software may include "Google Gadgets" (e.g., interactive mini-applications that can be placed anywhere on the user's desktop).

The desktop search module 300 may use Windows® desktop search software. The desktop search module 300 may be an implementation of a Windows® Search (e.g., an indexed desktop search platform released by Microsoft for the Windows® operating system) for Windows XP® and Windows Server 2003®. The desktop search module 300 may offer word wheeling (e.g., incremental find) of searches that may specify an advanced query syntax (AQS) (e.g., may provide advanced query operations as well). The desktop search module 300 may include a number of IFilters (e.g., a plugin that may allow an indexer such as Windows Indexing Service®) for a common file types (e.g., documents, audio, video as well as protocol handlers for Microsoft Outlook e-mails). Other protocol handlers and IFilters may be installed and/or integrated into the desktop search module as needed.

The desktop search module 300 may include a functionality (e.g., Windows Desktop Search) that may be exposed via a taskbar mounted deskbar. The desktop search module 300 may provide a text field to type the query. A set of results may be presented in a flyout pane. The desktop search module 300 may also integrate as a Windows Explorer® window (e.g., the window of FIG. 8). On selecting a file in the Windows Explorer® window, a preview of the file may be shown in the right hand side of the window, without opening the application which created the file. The search may be initiated from both interfaces. The search may open the browser to search the terms using a default search engine.

The deskbar (e.g., Windows Desktop Search deskbar of FIG. 11) generated by the desktop search module 300 may include a capability to create an application alias. An application alias may be a short string which may be set to open a set of different applications. This functionality may be accessed by prefixing the character (e.g., !) to a predefined string (e.g., a sequence of symbols or digits). For example "!calc" may open a calculator application (e.g., Windows Calculator). This feature may be used to create shortcut for a uniform resource locator (URL) and/or a network database file, which when entered, may open the particular URL and/or network database file in a browser. It may be used to send parametrized information over the URL and/or network database file, which may be used to create search aliases. For example, "w text" may be configured to search "text" in Wikipedia.

The desktop search module 300 may support natural language searches. The natural language search may allow the user to search for things like "photo received by Tom last month" or "email sent from Robert". However, the natural language search may be disabled by default. The natural language search may express the queries in Natural Query Syntax (NQS) (e.g., a natural language equivalent of AQS).

The desktop search module 300 may produce a preview plane that may display thumbnails (e.g., a reduced-size versions of pictures, used to make it easier to scan and recognize them, serving the same role for images as a normal text index does for words) of search results. The desktop search module 300 may use an indexed search platform (e.g., the indexed search platform in Windows Vista®, the indexed search platform in Windows Server 2008®, etc.). The indexed search platform may offer a superset of features provided by desktop search module. The indexed search platform may be an application programming interface (API) compatible. The desktop search module 300 may search indexed as well as non-indexed locations (e.g., the storage volumes 118A-N of FIG. 1, the network characteristic database module 214 of FIG. 2, the network characteristic database index module 216 of FIG. 2). For an indexed location the index may be used and for a non-indexed location. The property handlers and IFilters may be invoked on an as needed as the search is being performed. The desktop search module 300 may use Windows Search. The desktop search module 300 may use Group Policy (e.g., a feature an operating system that provides centralized management and configuration of a computer and a remote user in an active directory environment) for centralized management.

The desktop search module 300 may use a combination of virtual and real folders. The search functionality may be exposed by using a search bar in a start menu (e.g., user interface elements in the operating system which may serve as a central launching point for application and tasks). When searching from the start menu, the results may be shown in the start menu itself. This may overlap a recently used program. From the start menu, it may also be possible to launch an application by searching for its executable image name or display name. Searching from the search bar in a window may replace the content of the current folder with the search results. The window may render a set of thumbnails in the search results. A thumbnail handler may be registered for a particular file type. The window may produce an enhanced preview of items in a preview pane without launching a default application. This may provide functionality such as file type-specific navigation (e.g., a browsing a presentation using next/previous controls and/or seeking inside a media file). The preview handlers may allow edits (e.g., highlighting a text snippet) to be performed from the preview pane. The desktop search module 300 may use a control panel (e.g., a control panel metaphor to allow the user control of software and hardware features). In a control panel, the search bar in the window may search for control panel options.

The desktop search module 300 search may be saved to create a virtual folder (e.g., a saved search, etc.) with the same query string as the original search. The desktop search module 300 may use a search explorer (e.g., an integrated Windows Explorer window that is used for searches). The search explorer may use the graphical user interface (e.g., the graphical user interface of FIGS. 6, 7, 8 and 9) to specify the search parameters (e.g., a location and/or file types that should be searched, a specified operator, etc.) without crafting an AQS query by hand.

A search query may be saved as a virtual folder (e.g., a saved search, a search folder) which, when accessed, may run the search with the saved query and return the results as a folder listing. A search folder may be an XML file (e.g., a .search-ms extension) which stores a search query (e.g., an AQS, a NQS, etc.), including a set of search operators. The desktop search module may support a query composition, where a saved search (e.g., a scope) may be nested within the query string of another search. A search folder may be distributable via really simple syndication (RSS) (e.g., a family of Web feed formats used to publish frequently updated content such as blog entries, news headlines, and podcasts in a standardized format). A search folder may be shared as a searchmelt (e.g., a Windows Vista® search folder that has been changed to be generic and able to be shared). A search folder may be accessible over the network (e.g., the networks 120A-N of FIG. 1). Accessing a searchmelt over the network, like a regular search folder may make the results of the search available as a virtual shared folder. The search may be performed on a machine which may share the searchmelt, and may return only the results accessible from the network. The search folder may be scoped for local use only (e.g., before sharing, the search folder may be configured for remote access). The searchmelt may be created using Microsoft's SearchMelt Creator tool.

The desktop search module 300 may include a federation of searches to remote indexes, support for an electronic filing system (EFS), encrypted files and/or Windows Vista-style preview handlers that may allow document-type specific browsing of documents in the preview pane. The desktop search module 300 may also include the search federation capabilities of a desktop search program (e.g., a Windows® Live Search Center), which may allow searches to be delegated to remote web services using an open search specification (e.g., Microsoft Search Server). The desktop search module 300 may be supported on, but not limited to, Windows XP®, Windows Server 2003®, Windows Vista®, Windows Server 2008®, as well as Windows Home Server®).

The desktop search module 300 may contain a database index (e.g., the network characteristic database index module 216 of FIG. 2, the index module 308 of FIG. 3). The database index may index the network data stored in a database where network data is stored (e.g., the network characteristic database module 214 of FIG. 2). The database index may determine which network data is relevant to a user's query. The database index may index offline caches of network shares, in addition to the file systems (e.g., an e-mail store, Microsoft OneNote stores indexed by Windows Desktop Search, etc.). The database index may index removable drives. The database index module may support a query against a remote index (e.g., if the file server, on which a network file share is hosted, is running a computer system such as Windows Vista or Windows Server 2008, any searches against the share will be queried against the server's index and present the results to the client system, filtering out the limited accessibility files). This procedure may be transparent to the user.

The database index may perform the I/O operations with any priority (e.g., high and/or low priority). Whenever other processes require the I/O bandwidth or processor time, the other process may be able to pre-empt the database index module, thereby significantly reducing the performance hit associated with the database index module running in the background.

The desktop search module 300 may use a graphical user interface (e.g., the graphical user interface module 306 of FIG. 3). The user may use the graphical user interface (e.g., a type of user interface which allows people to interact with a computer and computer-controlled devices) enable control of the desktop search module 300 and assess the state of the desktop search module 300 in a manner readable by the user. The user may use the elements of the graphical user interface (e.g., check boxes, radio boxes, menus, side bars, etc. as shown in FIGS. 6-12) to generate a search query that may then be employed by the desktop search module 300 to perform a search of the indexed and/or network data. The graphical user interface may display the search query in its raw form, which may enable the user to preserve or reuse the query without rebuilding the query using the graphical user interface. The graphical user interface may employ an auto-completion function.

The graphical user interface may be any human-machine interface (HMI) (e.g., the graphical, textual and auditory information a computer program may present to the user and a set of control sequences such as keystrokes with a computer keyboard, movements of a computer mouse, and/or selections with a touchscreen that the user may employs to control the computer program). The graphical user interface may expose several user interfaces to serve different kinds of users (e.g., a computerized library database might provide two user interfaces, one for a specified group of users and be limited to set of functions, and/or another user interface for another group of users with wider set of functions).

The graphical user interface may use a set of programs that accept input via devices such as computer keyboard and/or a mouse and provide articulated graphical output on a computer monitor. The graphical user interface may use, but is not limited to, an object-oriented user interface (OOUI) and/or an application oriented interfaces. The graphical user interface may employ an HTML based web browser. The graphical user interface module 306 may employ a Web-based user interface (e.g., an interface that may accept input and provide output by generating a web page which is transmitted via a computer network (e.g., the Internet) and viewed by the user using a web browser program (e.g., Java®, AJAX®, Adobe® Flex, Microsoft .NET®, etc.).

The graphical user interface module 306 may provide realtime control in a separate program in order to eliminate the need to refresh an HTML based web browser. The graphical user interface module 306 may use a multi-screen interface (e.g., an interface that may employ a set of multiple displays to provide a flexible interaction). The graphical user interface module 306 may use a non-command user interface (e.g., an interface that may observe the user to infer the user's needs and intentions, without requiring that the user formulate explicit commands). The graphical user interface module 306 may use a reflexive user interface (e.g., an interface that the user may control and redefine the entire system via the user interface alone). The graphical user interface module 306 may employ several redundant input modalities and output modalities. The graphical user interface may allow the user to choose which ones to use for interaction.

The graphical user interface may be a visual front to a piece of software that links the user to the internal workings of a computer, or piece of software. The graphical user interface may use a pointer (e.g., a graphical image on a screen that indicates the location of a pointing device, and can be used to select and move objects or commands on the screen). The graphical user interface pointer may employ a pointing device (e.g., the mouse, a tracker ball, a touchpad, a pointing stick, a lightpen, and/or various other kinds of digitizing tablets).

Figure 7:
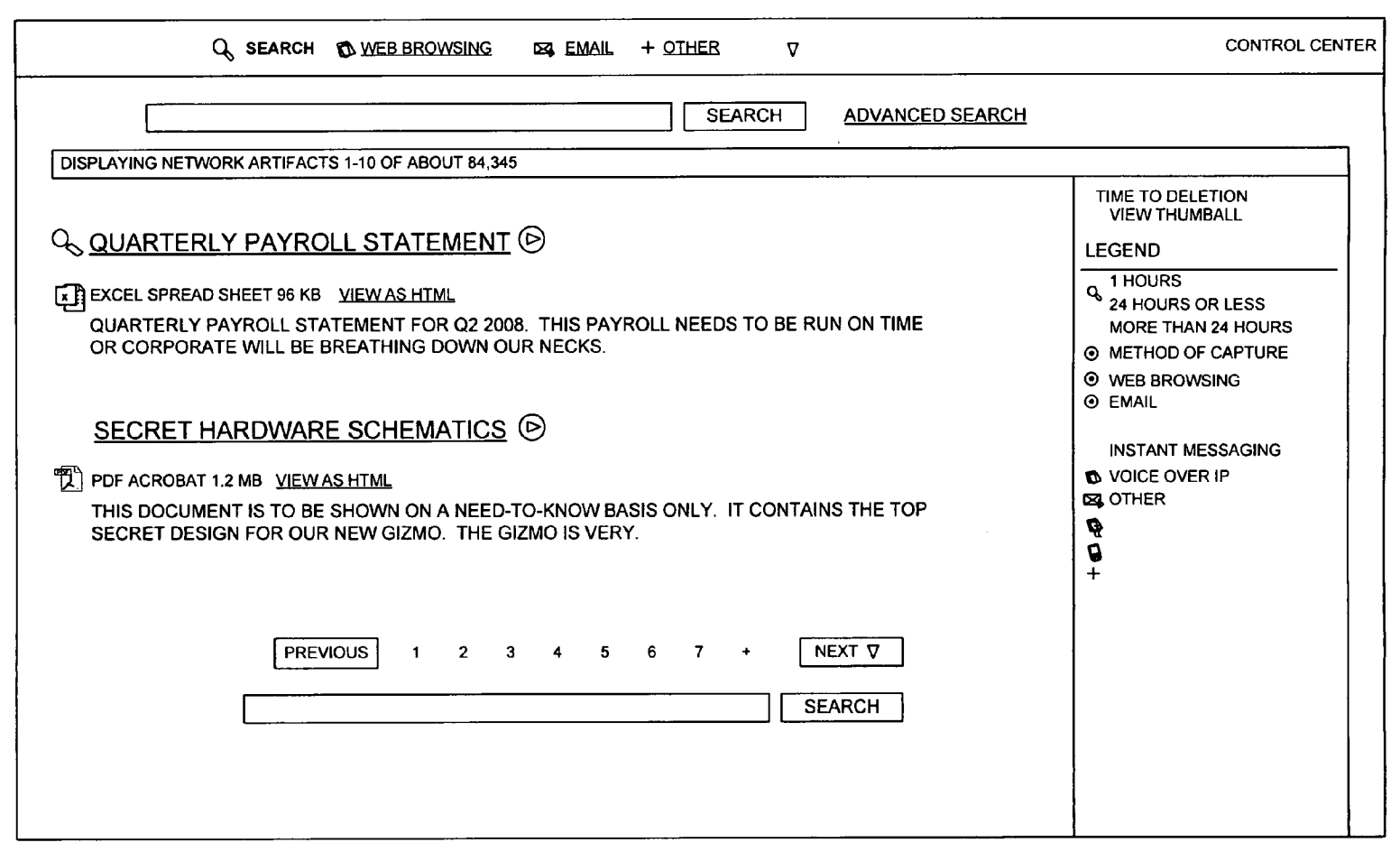

The graphical user interface may be a window (e.g., an area on the screen that displays information, with its contents being displayed independently from the rest of the screen as shown as an illustrative example in FIG. 7). The window may be placed in front or behind another window, its size may be adjusted, and scrollbars may be used to navigate the sections within it. Multiple windows may be open at one time, in which case each window may display a different application or file. The window may be a browser window (e.g., web browser, a terminal window, a child window, a message window) (e.g., as shown by illustrative example in FIG. 11) that may allows the user to move forward and backwards through a sequence of documents or web pages.

The graphical user interface may employ a menu (e.g., an on-screen list of alternatives) that may allow the user to execute commands by selecting from a list of choices (e.g., as shown by illustrative example in FIG. 6). The options may be selected with a mouse or other pointing device within the graphical user interface. A keyboard may be used. A menu bar may be displayed horizontally across the top of the screen and/or along the tops of some or all windows. A pull-down menu may be associated with a menu. When a user clicks on a menu option the pull-down menu may appear. A context menu may be used and may be invisible until the user performs a specific mouse action, (e.g., a press of the right mouse button). When the software-specific mouse action occurs the menu will appear under the cursor.

The graphical user interface may use an icon (e.g., a graphical image, a small picture, an object that represents a file, program, web page, or command). The graphical user interface may use a widget (e.g., a component of a graphical user interface with which a user interacts) as an interface element. The widget may be a window (e.g., a paper-like rectangle that represents a "window" into a document, form, or design area), a pointer (e.g., a spot where the mouse "cursor" is currently referencing), a text-box (e.g., a box in which to enter text or numbers), a button (e.g., an equivalent to a push-button as found on mechanical or electronic instruments), a hyper-link (e.g., a text with some kind of indicator that indicates that clicking it will take one to another screen or page), a drop-down list (e.g., a list of items from which to select), a check-box (e.g., as shown by illustrative example in FIG. 9) (e.g., a box which indicates an "on" or "off" state via a check-mark or an "x"), a radio button (e.g., a button, similar to a check-box, except that only one item in a group can be selected and selecting a new item from the group's buttons also deselects the previously selected button) (e.g., as shown by illustrative example in FIG. 9), a data grid (e.g., a grid view, a spreadsheet-like grid that allows numbers or text to be entered in rows and columns).

The graphical user interface may use a tab (e.g., a visual marker in a computer application, a box which usually contains a text label and/or graphical icon associated with a view pane). When activated a view pane, a window and/or a displays of widget associated with that tab may allow the user to switch quickly between different widgets and/or browser pages. The tabs may be placed in a group anywhere on the graphical user interface.

Figure 9:
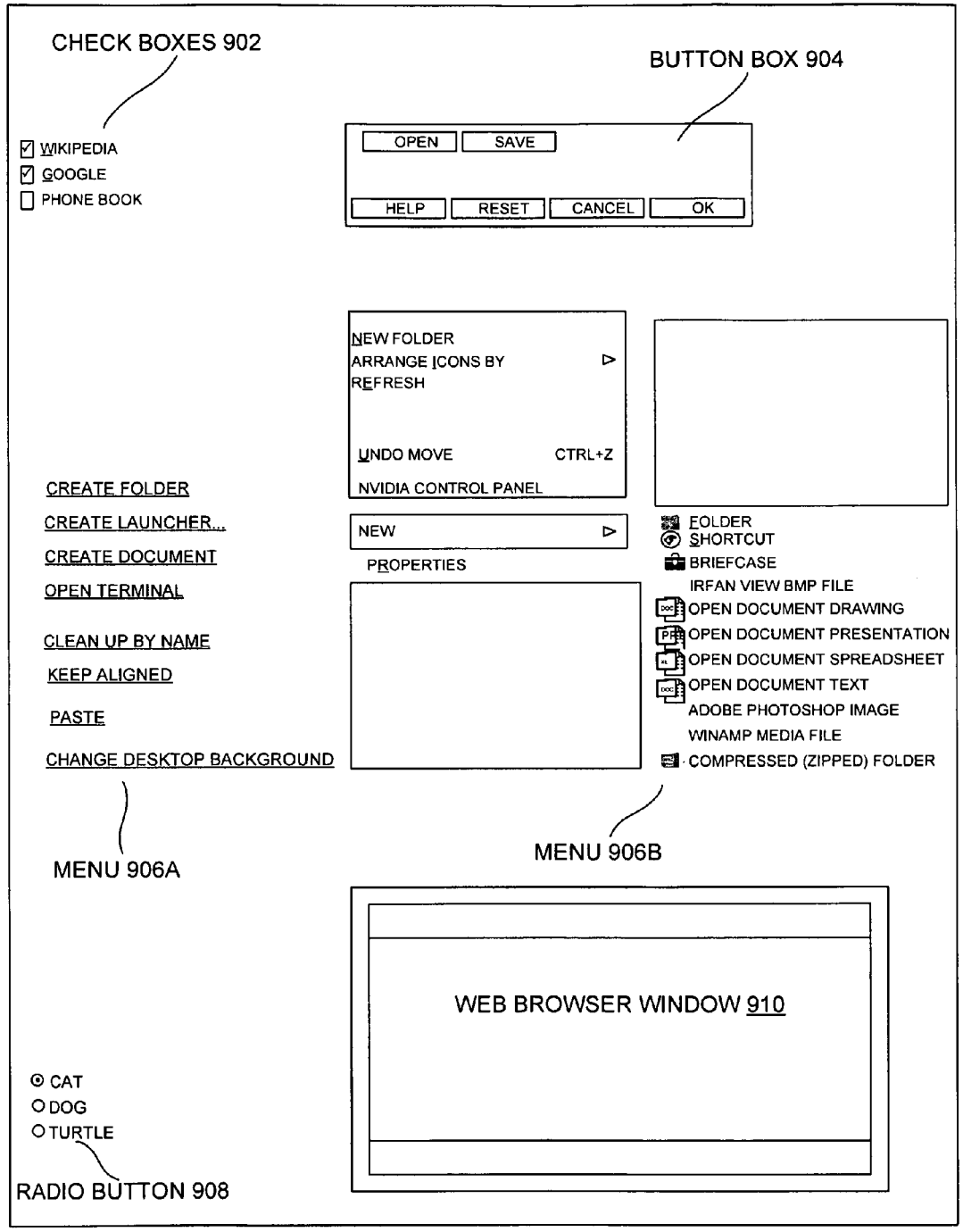

The radio buttons may be arranged in a group and displayed on screen as, for example, as a list of circular holes that can contain white space (for unselected) or a dot (for selected) (e.g., as shown by illustrative example in FIG. 9). Adjacent to each radio button may be a caption that may describe a choice that the radio button represents. When the user selects a radio button, any previously selected radio button in the same group may be becomes deselected. Selecting a radio button may be done by clicking the mouse on the button, or the caption, or by using a keyboard shortcut. Initially, none of the radio buttons in a group may be selected.

Figure 4:
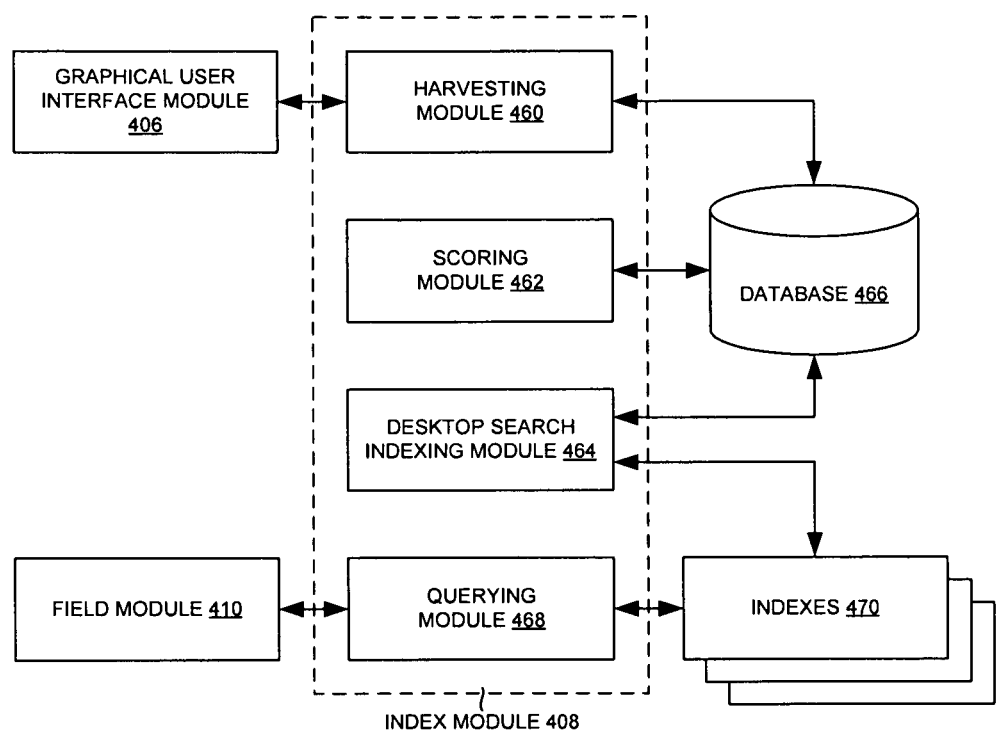
FIG. 4 is a system view of an index module communicating with a graphical user interface and a database, according to one embodiment.

FIG. 4 is a system view of an index module communicating with a graphical user interface and a database, according to one embodiment. Particularly, FIG. 4 illustrates a graphical user interface 406, an index module 408, field module 410, a harvesting module 460, a scoring module 462, a desktop search indexing module 464, a database 466, a querying module 468, and indexes 470, according to one embodiment.

The harvesting module 460 may manage (e.g., harvest) data, search queries, results associated to the queries. The scoring module 462 may include a counter that increments a count based on a number of files that move in network traffic associated with each of the client devices. The desktop search indexing module 464 may enable the user to search for data communicated to external networks and/or devices through the network. The database 466 may process (e.g., hold, store, etc.) the data (e.g., search queries, results, scores, etc.) obtained from the network. The querying module 468 may enable the user to search for data using queries.

The indexes 470 may be organized by an analysis of the content and subject matter of a document. The indexing analysis may identify the concepts represented in the document and/or the allocation of descriptors to assist with retrieval of documents according to concepts included or related to the documents. The graphical user interface 406 may enable communication between a user and a computer by visual images, such as buttons, pictures, or icons and/or command lists. The graphical user interface 406 may be controlled using a mouse. The field module 410 may enable the user to search for specific data through the web/desktop/indexing, etc.

In an example embodiment, FIG. 4 may illustrate the graphical user interface 406 and the field module 410 to search the database 466. The harvesting module 460 may communicate with the database 466. The scoring module 462 may communicate with the database 466. The desktop search indexing module 464 may communicate with the database 466, and the indexes 470. The querying module 468 may communicate with the indexes 470, and the field module 410. The graphical user interface 406 may communicate with the harvesting module 460.

Figure 5:
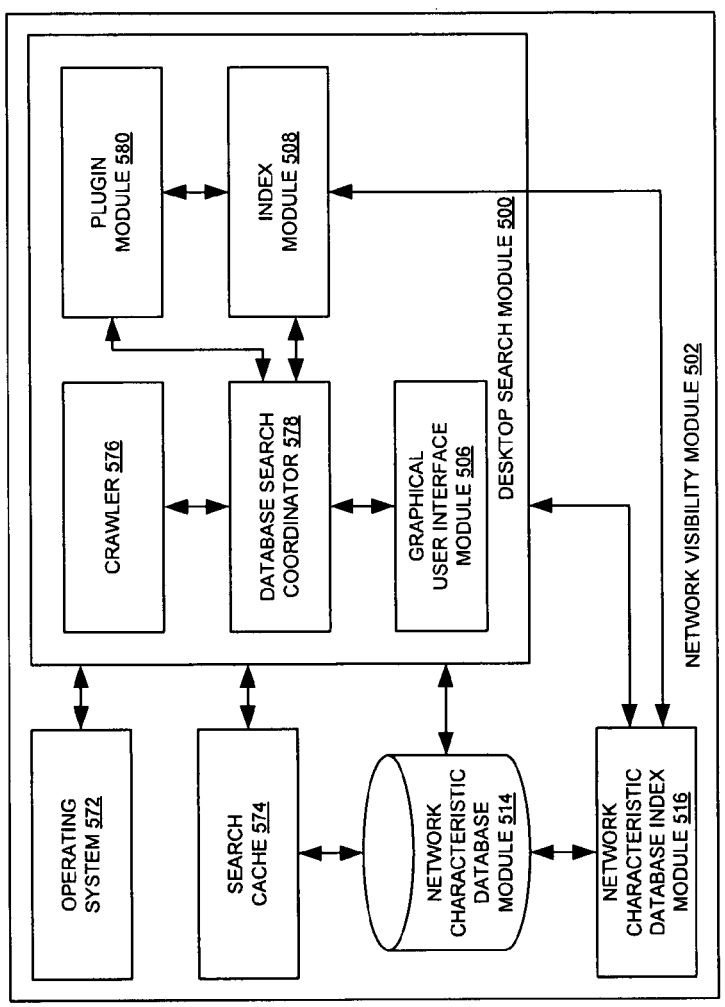
FIG. 5 is an alternative system view of the network visibility module of FIG. 1, according to one embodiment.

FIG. 5 is an alternative system view of the network visibility module 102 of FIG. 1, according to one embodiment. Particularly, FIG. 5 illustrates a desktop search module 500, a network visibility module 502, a graphical user interface module 506, an index module 508, a network characteristic database module 514, a network characteristic database index module 516, an operating system 572, a search cache 574, a crawler 576, a database search coordinator 578, and a plugin module 580, according to one embodiment.

The operating system 572 may be a software component of a computer system that may be responsible for the management and/or coordination of activities and the sharing of the resources of the computer. The operating system 572 may offer a number of services to application programs and the users (e.g., the user device 122A-N). The search cache 574 may search the contents of the cache memory at several levels of operation, including cache memory and a disk cache. The crawler 576 may be a program and/or automated script which may browse the World Wide Web in a methodical and/or automated manner. The database search coordinator 578 may coordinate to search the set of network characteristics that may be stored in network characteristic database module 514 and/or the network characteristic database index module 516. The plugin module 580 may allow detecting the various plugin components by the network visibility module 502 that may be plugged in the network 120A-N.

In an example embodiment, the desktop search module 500 may communicate with the operating system 572, the search cache 574, the network characteristic database module 514, and the network characteristic database index module 516 to make the required search. The desktop search module 500 may include the database search coordinator 578 which may communicate with the plugin module 580, the index module 508 and the graphical user interface module 506. The plugin module 580 may communicate with the index module 508.

FIGS. 6-12 are example views of user interfaces, according to various embodiments. FIG. 6 is a user interface view illustrating advanced search with filled up questionnaire, according to one embodiment. Particularly, FIG. 6 illustrates the advanced search 602, the option 604, the option 606, the option 608, the option 610, an option 612, and an option 614, according to one embodiment.

In an example embodiment, an advanced search may be performed using various advanced tools and/or methods (e.g., a questionnaire). The option 604 may illustrate various saved searches and may provide delete, update, and search options to perform on a selected search. The option 606 may illustrate a customized search based on the visual inputs of the advanced search 602. The option 606 may allow a user to enter search terms and instructions directly rather than through visual options such as pull down menus, radio buttons, or other options. The option 608 may illustrate various search options, such as all of a group of words, an exact phrase, at least one of the words, or none of the words. The option 610 may allow a user to select time frames of a search, such as within a selected time period, using a particular interface, involving a particular user and/or IP address, or involving a particular domain or IP. The option 612 may allow a user to customize a presentation of the output of the search of the extracted artifacts. The output options may include a number of artifacts illustrated per page, a limit to a particular file type. The option 614 may allow a user to search for emails involving particular people, email addresses, or including attachments, particular attachments, or with particular subject lines.

FIG. 7 is a user interface view that illustrates the result of a search, according to one embodiment. Particularly, FIG. 7 illustrates two documents that may be found while performing the search. In an example embodiment, FIG. 7 illustrates two documents found on the search which are "an excel sheet of quarterly payroll statement and a PDF document named secret hardware schematics."

Figure 8:
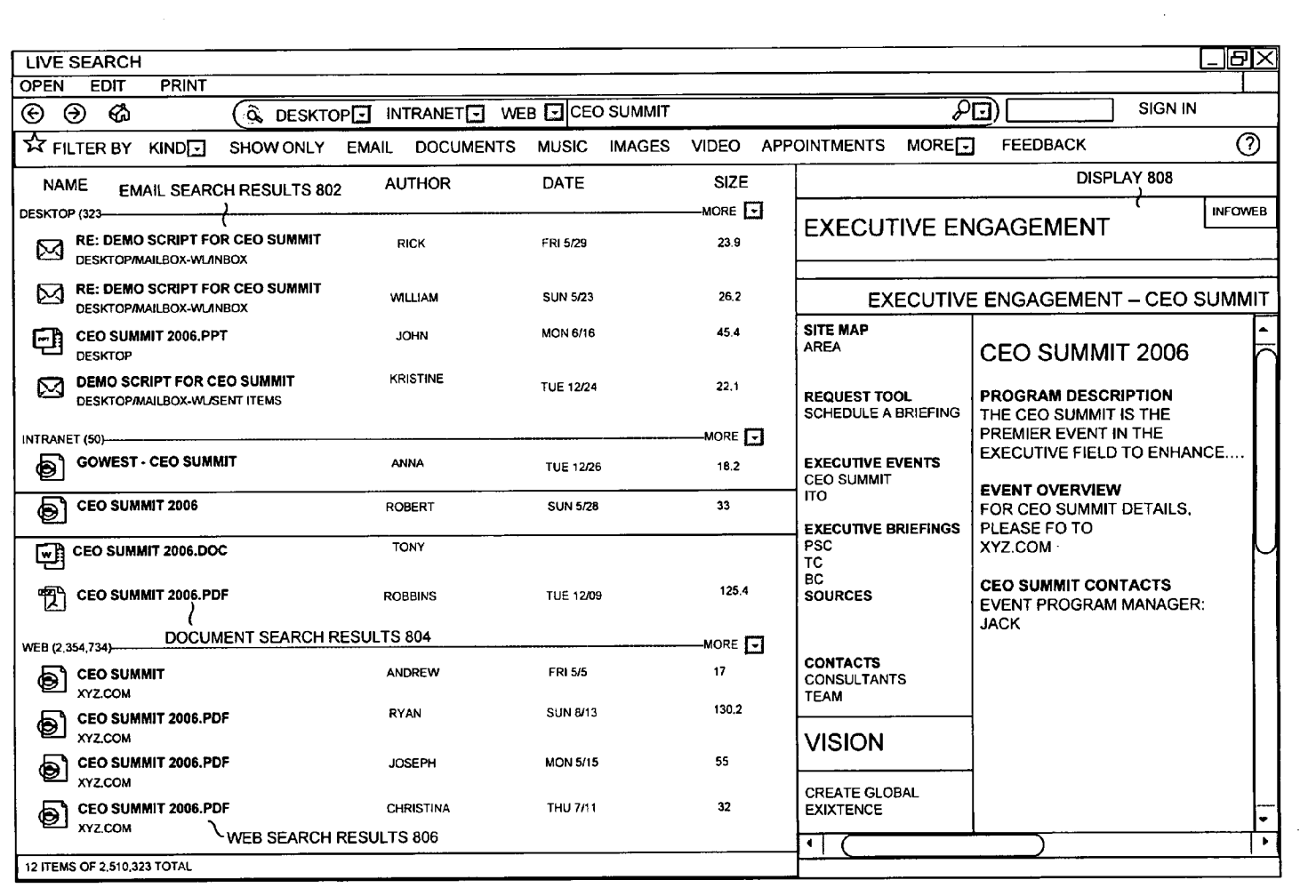

FIG. 8 is a user interface view illustrating a search result based on various categories, according to one embodiment. Particularly, FIG. 8 illustrates email search results 802, document search results 804, web search results 806, and a display 808, according to one embodiment.

The email search results 802 may be emails obtained from an indexed database of extracted artifacts. The email search results 802 may be obtained in accordance with search parameters entered through a graphic user interface, and the email search results 802 may be categorized by date, sender, receiver, attachments, or any other category. The document search results 804 may include documents identified in accordance with a search, and may include documents such as text files, word processing files. In another embodiment, any type of program file, raw data, executable file, encrypted data, or other data associated with an extracted artifact may be displayed when relevant to a search result.

The web search results 806 may include web pages that were accessed using a network monitored to obtain and record network traffic. The web search results may include the content data of the web pages that were accessed as of the time and date of access, including videos, advertisements, data transfers, audio, date stamps, and other information that may change over time. The display 808 may illustrate the search results by name, category, an index identifier, a rendered image, a summary, or any parameter used to generate and/or sort the search results.

FIG. 9 is an example view of features of a user interface window, according to one embodiment. Particularly, FIG. 9 illustrates check boxes 902, a button box 904, a menu 906A-B, a radio button 908, and a web browser window 910, according to one embodiment. The check boxes 902, a button box 904, a menu 906A-B, and the radio button 908 may be used to illustrate commands and/or search parameters that a user may use to form a query. The web browser window 910 may be used to display the results of the search and/or the generated search query.

Figure 10:
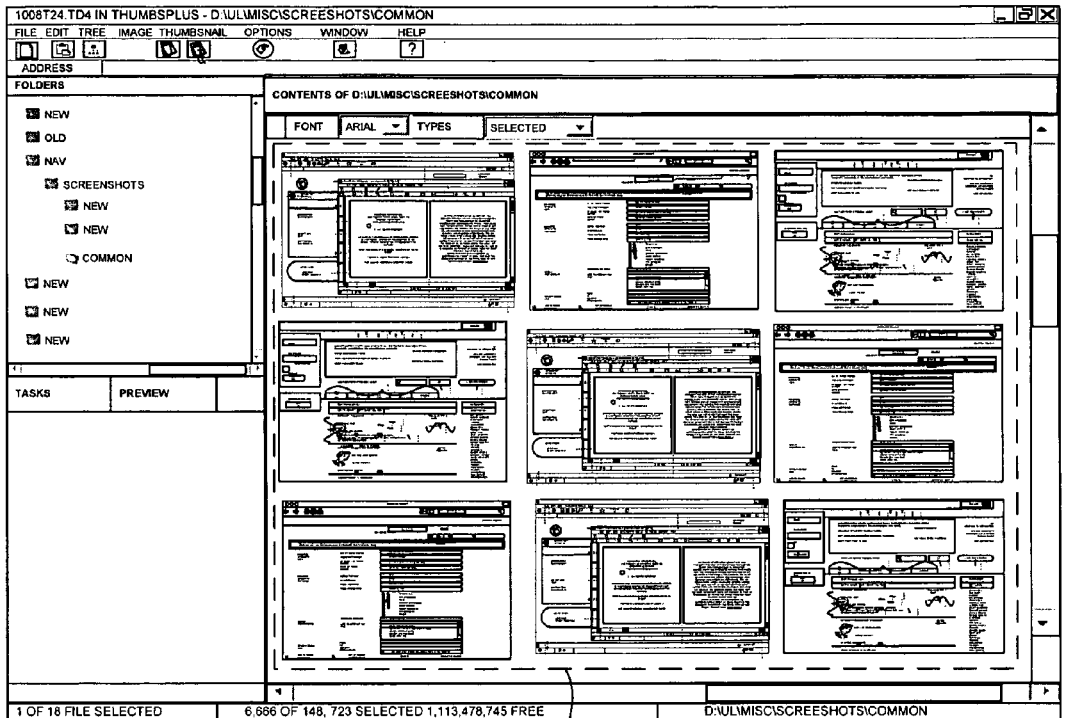

FIG. 10 is an example view of features of a user interface window, according to one embodiment. Particularly, FIG. 10 illustrates thumbnail images of screenshots 1000. The thumbnail images of screenshots 1000 may include a reconstruction of an extracted artifact using a virtual client application. The thumbnail images of screenshots 1000 may be formed using a snapshot of an image of the reconstructed view.

Figure 11:
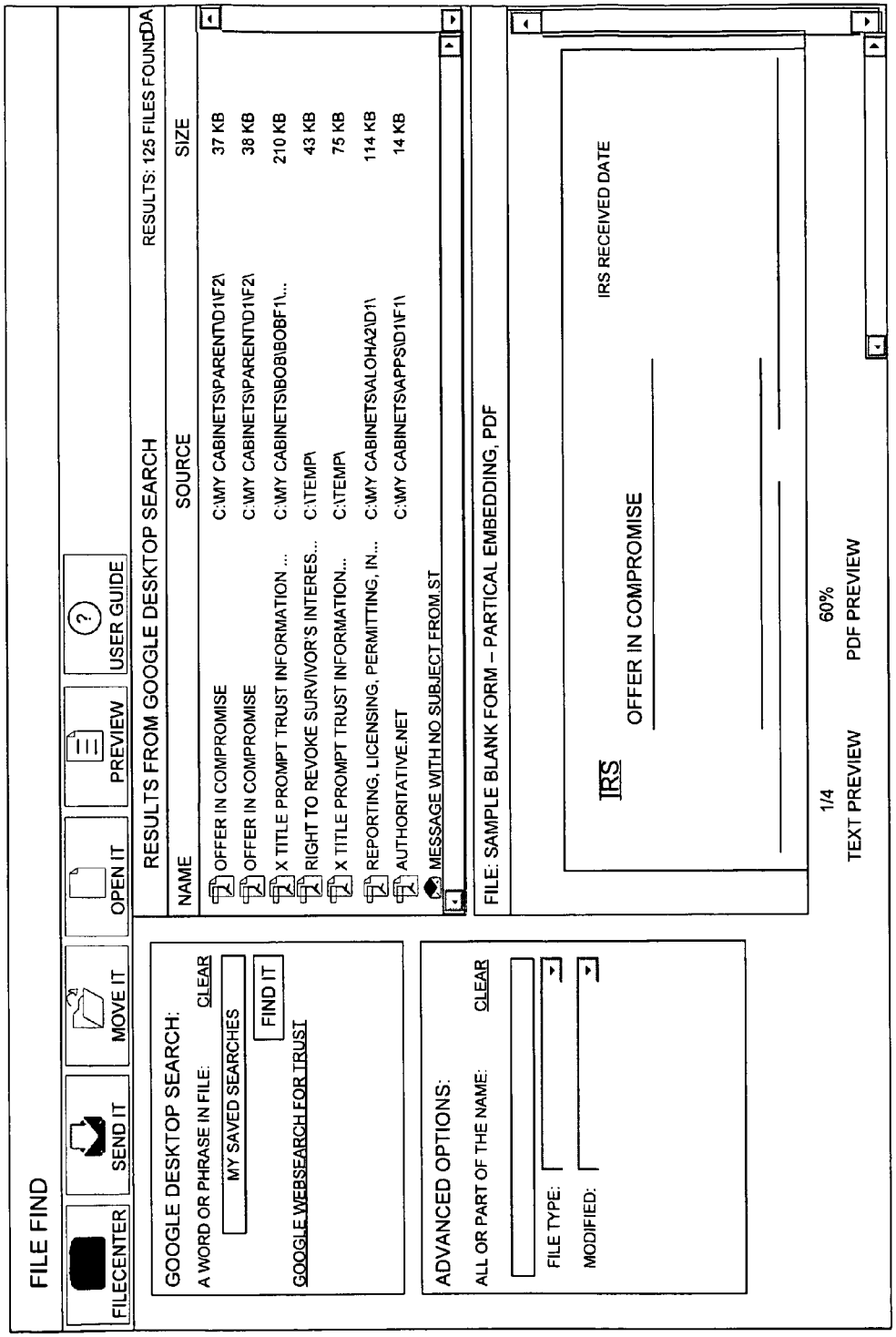

FIG. 11 is an example view of features of a user interface window, according to one embodiment. Particularly, FIG. 11 illustrates a search result of a query based on trusts. As illustrated, the search result may show files that "trust" as part of the document title. Other parameters may be used to identify documents that appear as a search result for queries associated with trusts, such as document contents, a definition of a trust, and documents attached to emails referring to trust. Search results may indicate a file size, a file location, and a number of files identified through the search. A preview of one or more of the documents identified through the search result may be displayed in a separate window.

Figure 12:
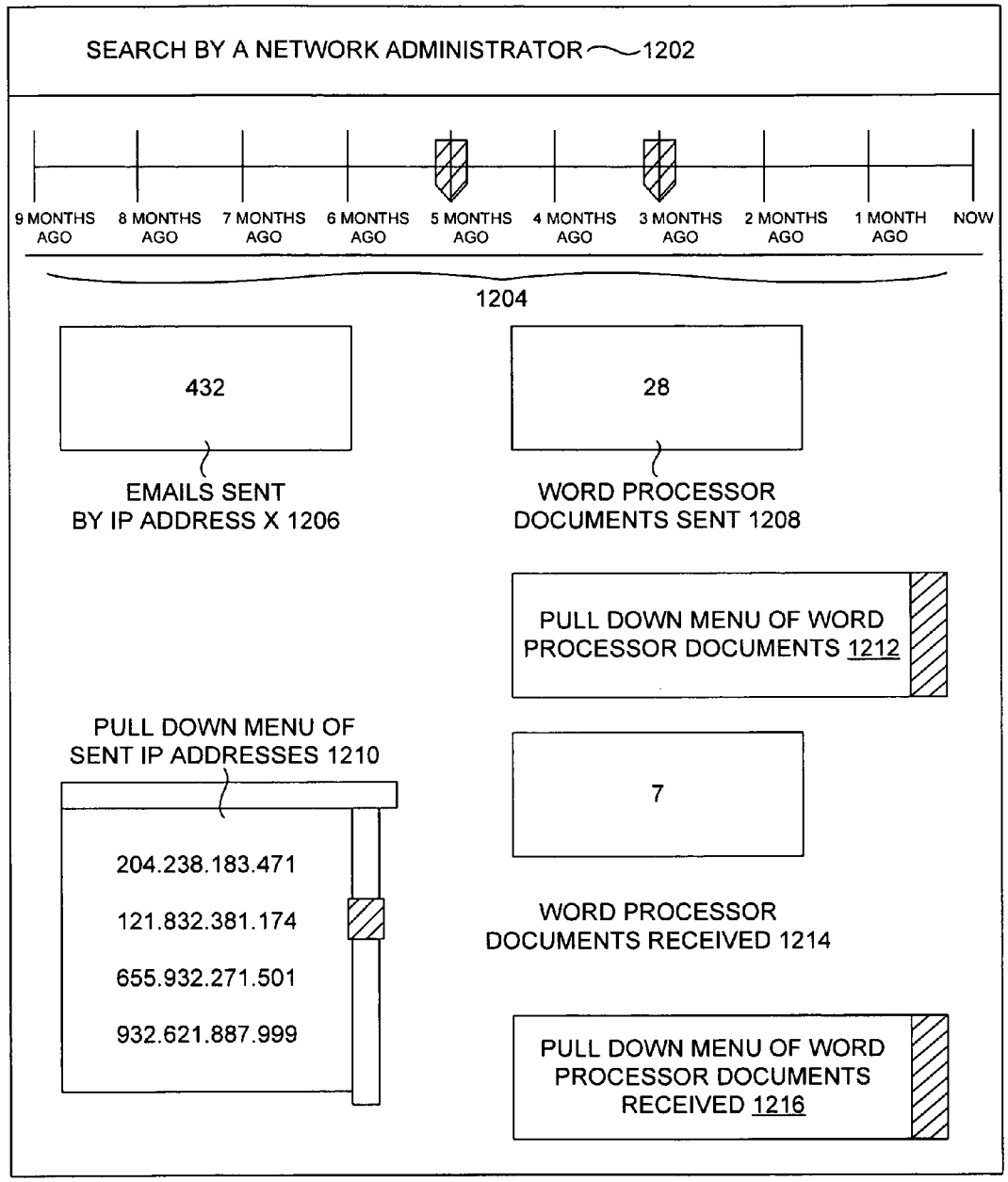

FIG. 12 is a graphical user interface view of a search made by a network administrator application, according to one embodiment. Particularly, FIG. 12 illustrates a search by a network administrator 1202, a time range 1204, emails sent by IP address X 1206, a word processor documents sent 1208, a pull down menu of sent IP addresses 1210, a pull down menu of word processor documents 1212, a word processor documents received 1214, a pull down menu of word processor documents received 1216, according to one embodiment.

The search by the network administrator 1202 may be performed to identify word processor documents that were communicated across a network, monitored, and acquired within a selected time frame. The time range 1204 may provide the option to the user (e.g., network administrator) to select a particular time range (e.g., one month prior to the search, two weeks prior to the search until the present, etc.) to view and/or search network traffic that occurred in the past.

The emails sent by IP address X 1206 may list the total number of emails sent by the computer associated with the IP address X in a particular network during the given time range. The word processor documents sent 1208 may list the total number of documents sent by the computer associated with an IP address in the given time range. The pull down menu of sent IP addresses 1210 may provide a list of destination IP addresses of emails and other artifacts that were communicated over the network by the identified IP address. The pull down menu of word processor documents sent 1212 may list the names of word processor documents that communicated over the network.

The word processor documents received 1214 may list a part of the word processor documents received by the machines connected to the network. The pull down menu of word processor documents received 1216 may list a substantial portion of the word processor documents received by software or hardware that was connected for some time period to the network.

Figure 13:
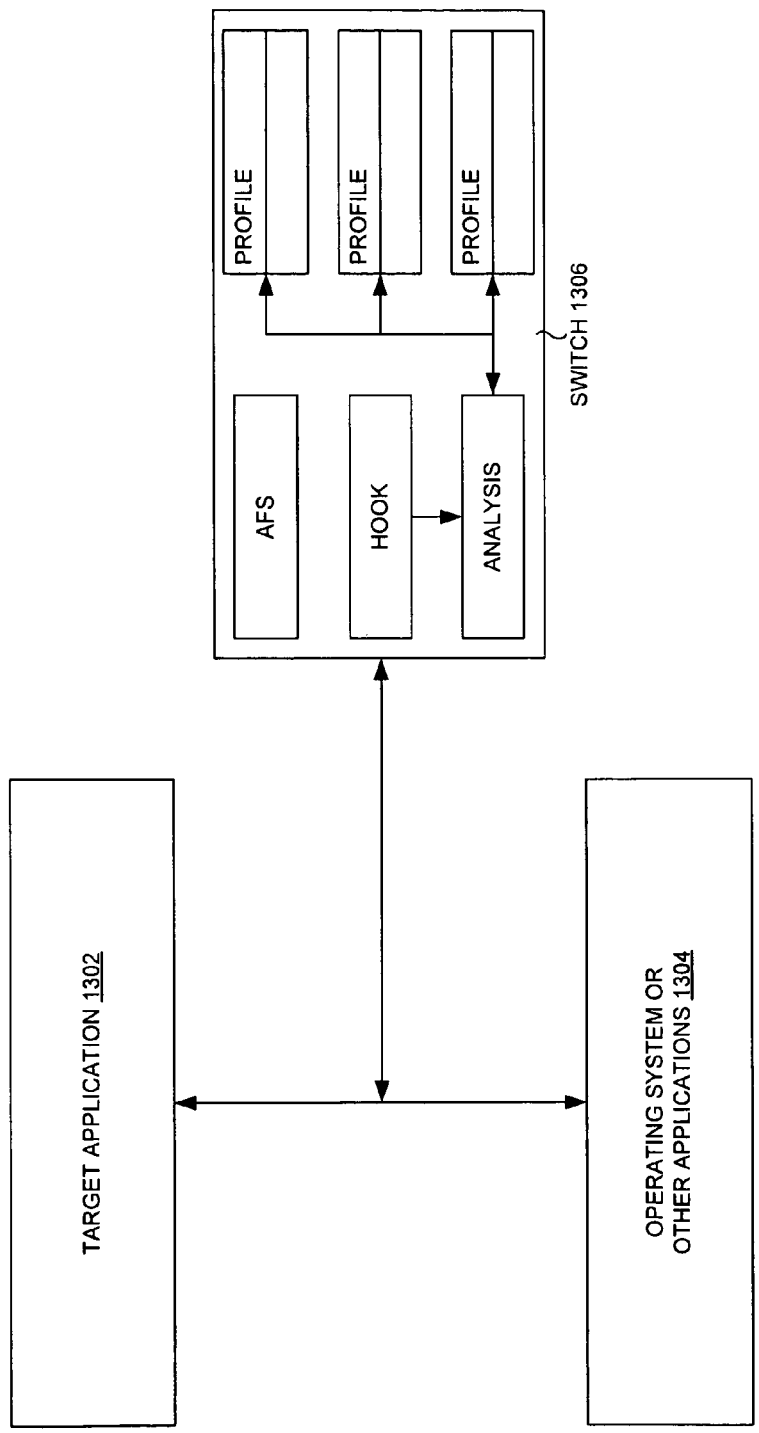
FIG. 13 is a system view in which a virtual software switch may communicate with a target application, an operating system or other applications, according to one embodiment.

FIG. 13 is a system view in which a virtual software switch may communicate with a target application, an operating system or other applications, according to one embodiment. Particularly, FIG. 13 illustrates a target application 1302, an operating system or other applications 1304, and a switch 1306, according to one embodiment.

The target application 1302 may be an application program that may be used for searching. The operating system or other applications 1304 may be any of the related operating system or other applications required to execute and/or operate the data/files sent by the switch 1306. The switch 1306 may enable the communication between the different virtual machines by analyzing the profile (e.g., of the client device). In an embodiment, the switch 1306 may be a hardware switch or a virtual software switch.

In an example embodiment, the switch 1306 may include an AFS application (e.g., a file system), a hook application, an analysis application and various profiles. The switch 1306 may communicate with the target application 1300 and/or the operating system or other applications 1302. The switch 1306 may be used to transfer data between different ports of the switch 1306, which may be used to limit and/or distribute data between applications and/or hardware devices connected to the network.

Figure 14:
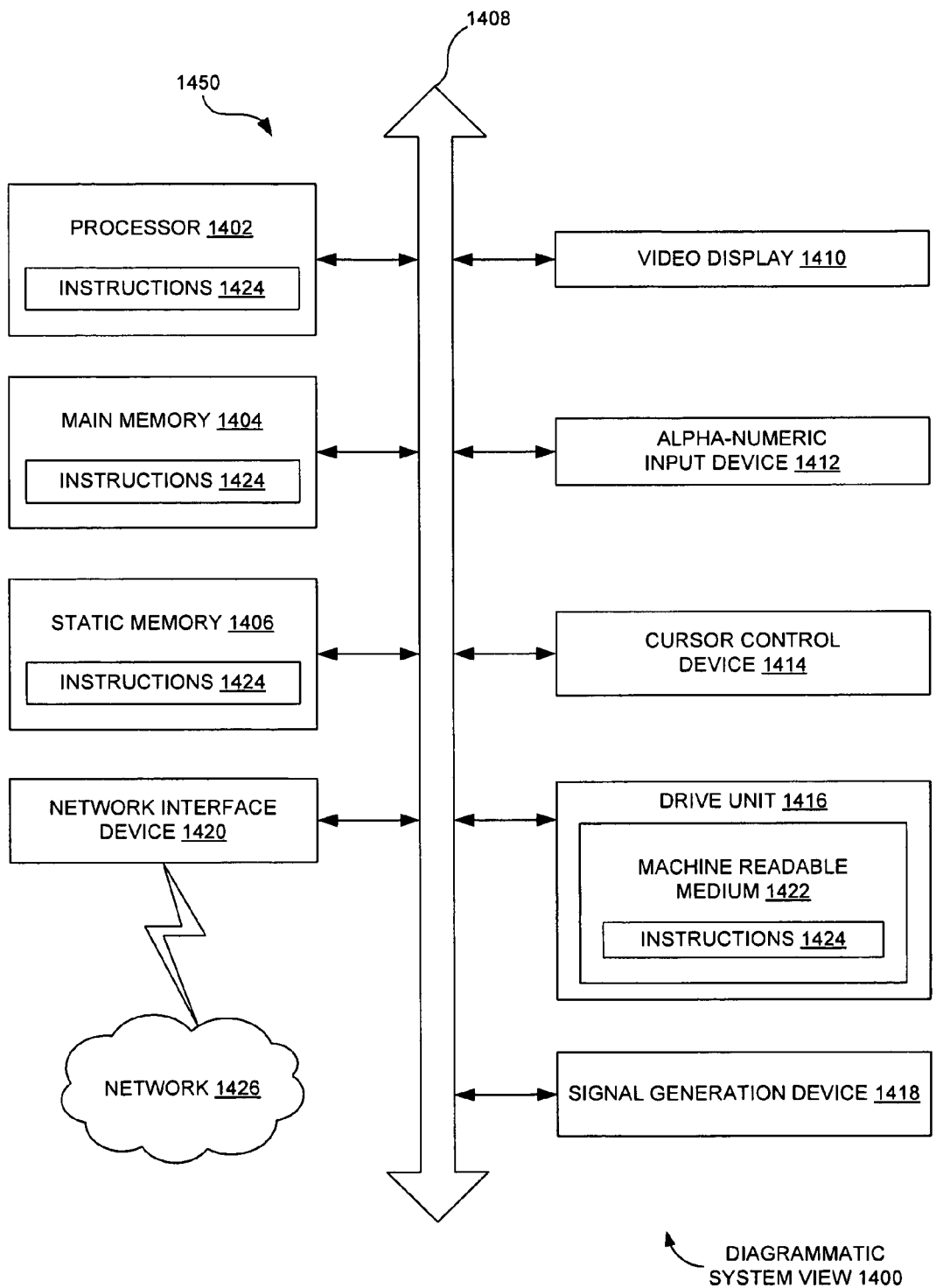
FIG. 14 is a diagrammatic system view of a data processing system in which any of the embodiments disclosed herein may be performed, according to one embodiment.

FIG. 14 is a diagrammatic system view of a data processing system in which any of the embodiments disclosed herein may be performed, according to one embodiment. Particularly, the diagrammatic system view 1400 of FIG. 14 illustrates a processor 1402, a main memory 1404, a static memory 1406, a bus 1408, a video display 1410, an alpha-numeric input device 1412, a cursor control device 1414, a drive unit 1416, a signal generation device 1418, a network interface device 1420, a machine readable medium 1422, instructions 1424, and a network 1426, according to one embodiment.

The diagrammatic system view 1400 may indicate a personal computer and/or the data processing system in which one or more operations disclosed herein are performed. The processor 1402 may be a microprocessor, a state machine, an application specific integrated circuit, a field programmable gate array, etc. (e.g., Intel® Pentium® processor). The main memory 1404 may be a dynamic random access memory and/or a primary memory of a computer system.

The static memory 1406 may be a hard drive, a flash drive, and/or other memory information associated with the data processing system. The bus 1408 may be an interconnection between various circuits and/or structures of the data processing system. The video display 1410 may provide graphical representation of information on the data processing system. The alpha-numeric input device 1412 may be a keypad, a keyboard and/or any other input device of text (e.g., a special device to aid the physically handicapped).

The cursor control device 1414 may be a pointing device such as a mouse. The drive unit 1416 may be the hard drive, a storage system, and/or other longer term storage subsystem. The signal generation device 1418 may be a bios and/or a functional operating system of the data processing system.

The network interface device 1420 may be a device that performs interface functions such as code conversion, protocol conversion and/or buffering required for communication to and from the network 1426. The machine readable medium 1422 may provide instructions on which any of the methods disclosed herein may be performed. The instructions 1424 may provide source code and/or data code to the processor 1402 to enable any one or more operations disclosed herein.

Figure 15:
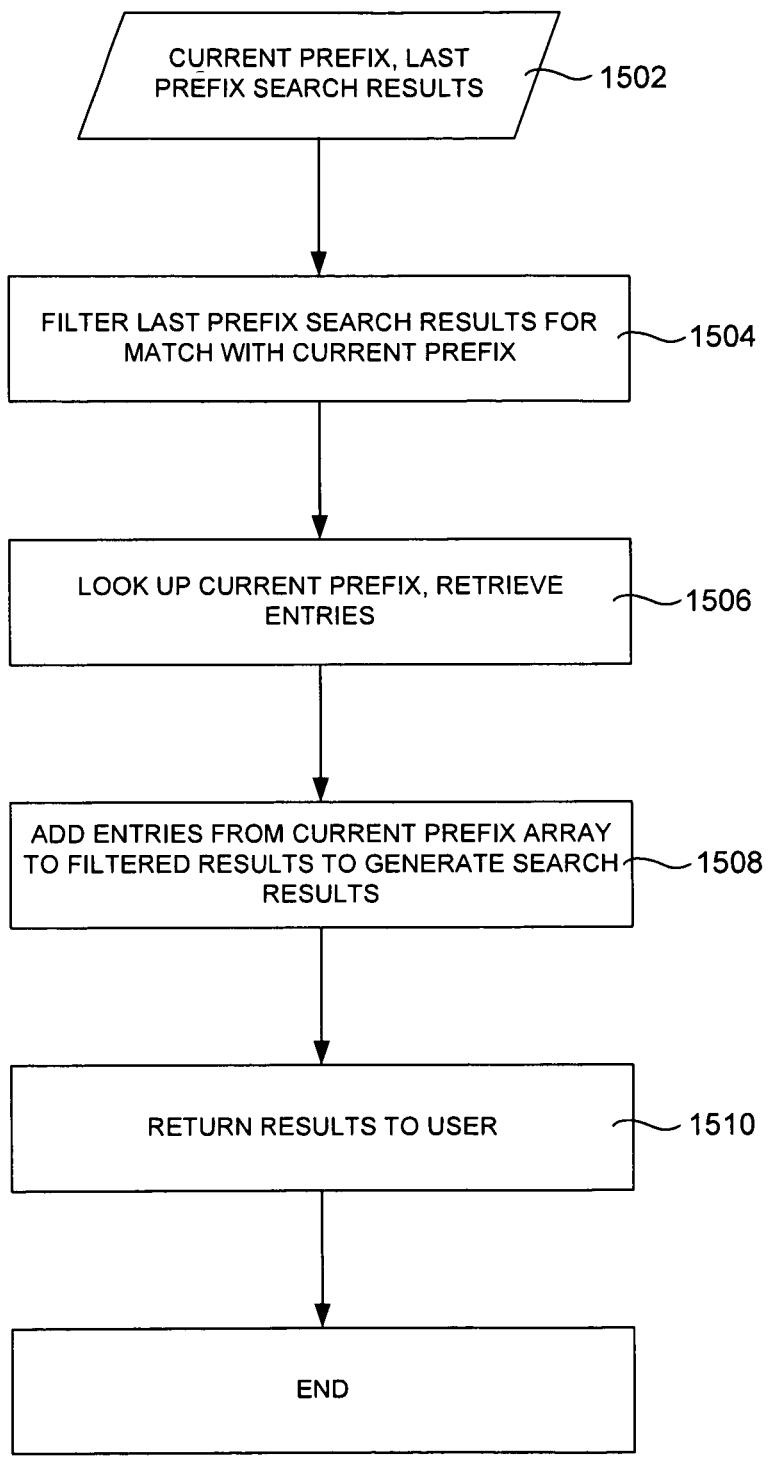
FIG. 15 is a flow chart illustrating a current prefix and last prefix search results, according to one embodiment.

FIG. 15 is a flow chart illustrating a current prefix and a last prefix search results, according to one embodiment. In operation 1502, current prefix, last prefix search results data may be acquired. In operation 1504, the last prefix search results may be filtered to identify a match with the current prefix. In operation 1506, the current prefix may be looked up and entries may be retrieved. In operation 1508, entries may be added from a current prefix array to the filtered results to generate search results. In operation 1510, the search results may be returned to the user.

In an example embodiment, the user interface may illustrate the results of the search. A save option may enable a user to save the results of a search. A search option may enable the user to search for more results associated to the query. An image results display may include the results (e.g., images) that are obtained from the search. A file results display may include the result (e.g., may be word processing documents, PDF files, etc.) that are obtained as a result of the search. Examples of search results may include a button save image or a text file discussing plans for an activity.

Figure 16:
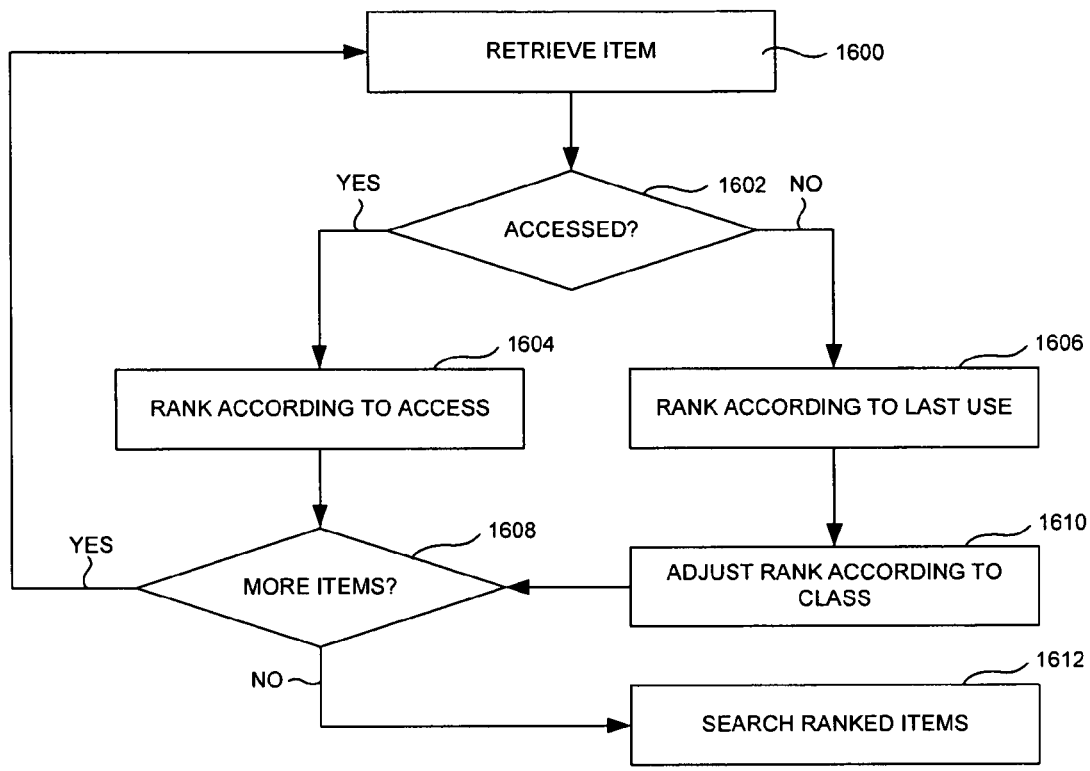
FIG. 16 is a flow chart illustrating retrieving, searching, and ranking an item of a database, according to one embodiment.

FIG. 16 is a flow chart illustrating retrieving, searching, and ranking an item of a database, according to one embodiment. In operation 1600, the item (e.g., an extracted artifact) may be retrieved from the database. In operation 1602, whether the retrieved items in operation 1600 has been accessed may be determined. If the item has been accessed, in operation 1604, the item is ranked according to the access that occurred. If the item has not been accessed, item is ranked according to its last use. In operation 1608, whether additional items should be processed is determined. If another item is to be processed, then the process returns to operation 1600. If no additional item is to be processed, in operation 1612, the ranked items are searched. In operation 1610, after an item has been ranked in accordance with its last use, the rank is adjusted according to class, and whether an additional item is to be processed is determined in operation 1608.

Figure 17:
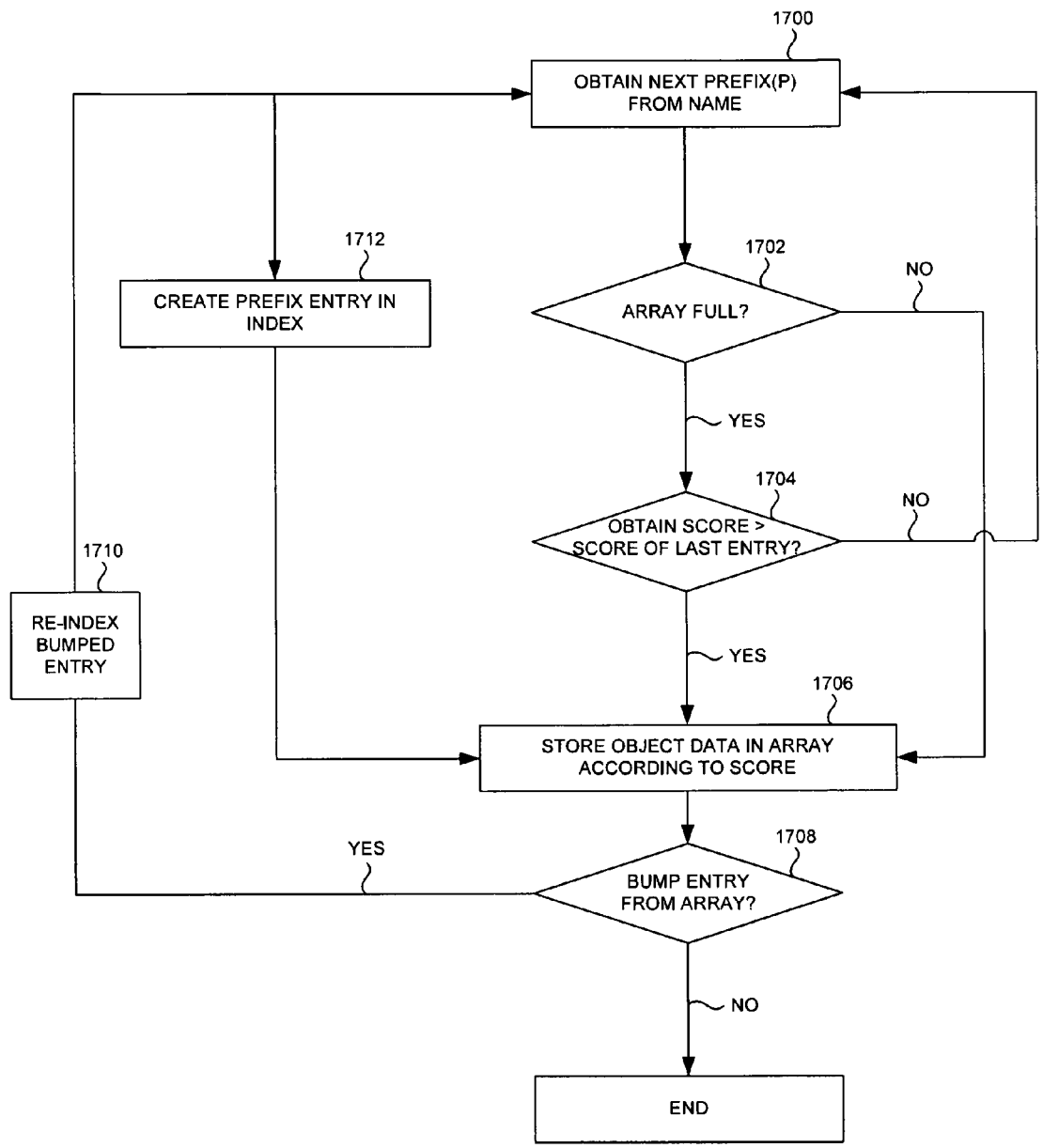
FIG. 17 is a process flow to store a prefix in an array based on a name and a score, according to one embodiment.

FIG. 17 is a process flow to store a prefix in an array based on a name and a score, according to one embodiment. In operation 1700, the next prefix (p) may be obtained from a name. In operation 1702, whether the array is full may be determined. In operation 1704, if the array is full, whether the obtained score is greater than the score of the last entry may be determined. In operation 1706, if the array is determined in operation 1704 to not be full, then the object data is stored in the array according to the score. In addition, if the obtained score is greater than the score of the last entry, then the object data is stored in the array according to the score in operation 1706. After operation 1706, whether an entry should be bumped from the array is determined in operation 1708. If not, the process flow is ended. If the entry should be bumped, in operation 1710, the bumped entry is re-indexed, and the process returns to operation 1700. In addition, after the bumped entry is re-indexed, in operation 1712, a prefix entry is created in the index. The object data is then stored in the array according to the score in operation 1706.

Figure 18:
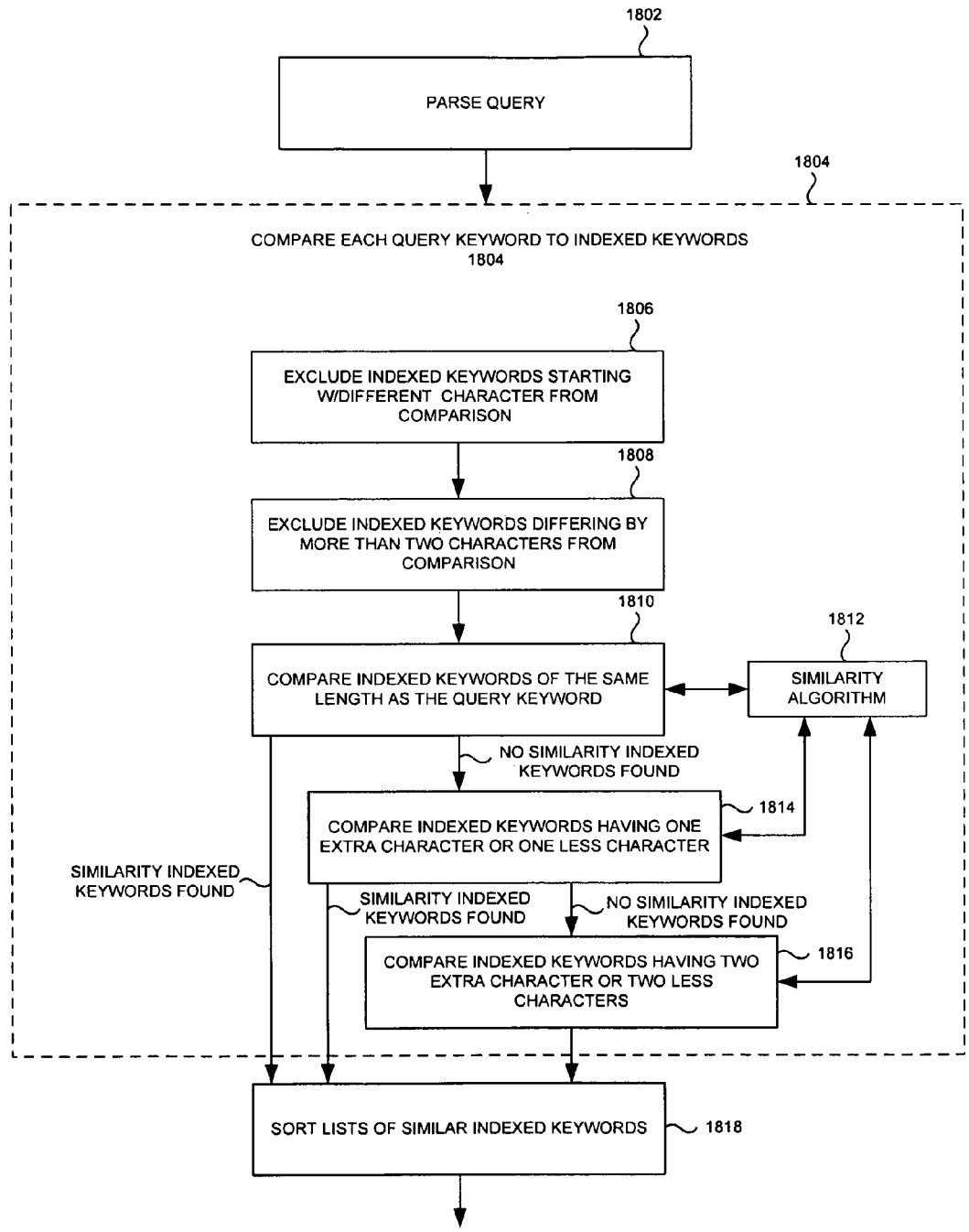
FIG. 18 is a flow chart to illustrate a similarity algorithm, according to one embodiment.

FIG. 18 is a flow chart to illustrate a similarity algorithm, according to one embodiment. In operation 1802, a query is parsed. In operation 1804, each query keyword is compared with the indexed keywords. In operation 1806, indexed keywords starting with different characters are excluded from the comparison. In operation 1808, indexed keywords differing by more than two characters are excluded from the comparison. In operation 1810, indexed keywords of the same length may be compared with the query keyword. If there are no similarity indexed keywords, in operation 1814, indexed keywords with one more or one less character are compared. If there are no similarity indexed keywords, in operation 1816, indexed keywords with two more or two less characters are compared. Operations 1810, 1814, and 1816 may communicate with and use a similarity algorithm of operation 1812. In operations 1810 and 1814, if similarity indexed keywords are found, then in operation 1818, lists of similar indexed keywords are sorted. After operation 1816, operation 1818 is performed to sort lists of similar indexed keywords.

Figure 19:
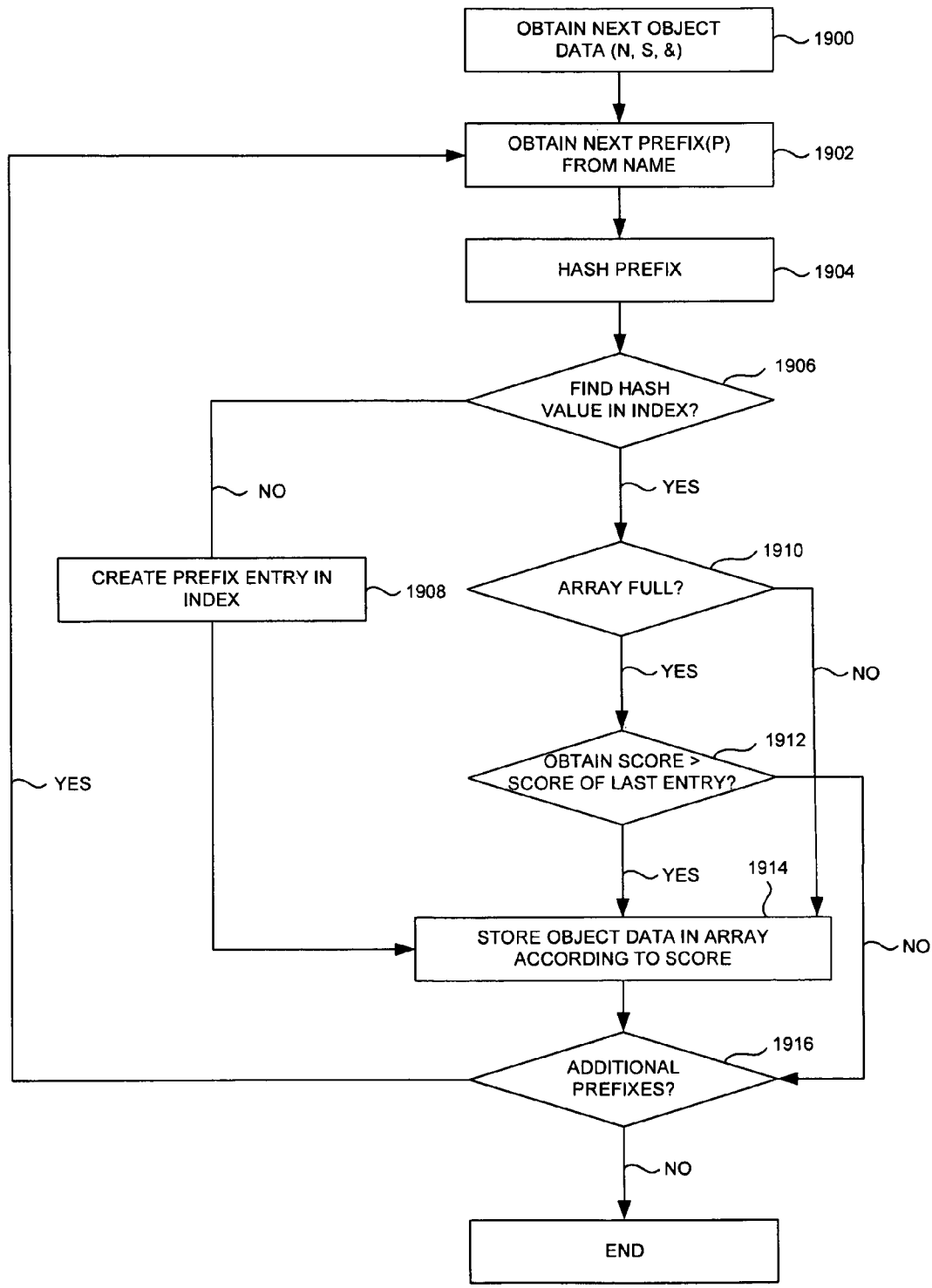
FIG. 19 is process flow to obtain an object data and a hash value, according to one embodiment.

FIG. 19 is process flow to obtain an object data and a hash value, according to one embodiment. In operation 1900, a next object data (N, S, &) is obtained. In operation 1902, the next prefix (P) may be obtained from a name. In operation 1904, the hash value is prefixed. In operation 1906, whether the hash value is in the index is determined. If the hash value is not in the index, then in operation 1908, the prefix entry is created in the index. If the hash value is in the index, in operation 1910, whether the array is full is determined. If the array is full, in operation 1912, whether an obtained score is greater than the score of the last entry is determined. Operation 1914 is performed after operation 1908, if in operation 1912 the obtained score is greater than the score of the last obtained score, or if in operation 1910, the array is not full. In operation 1914, an object data is stored in the array according to the score. Operation 1916 occurs after operation 1914 or if in operation 1912 the obtained score is not greater than the score of the last entry. In operation 1916, whether there is an additional prefix is determined. If not, then the process ends. If there is an additional prefix, the process returns to operation 1902, in which the next prefix (P) is obtained from the name.

Figure 20A:
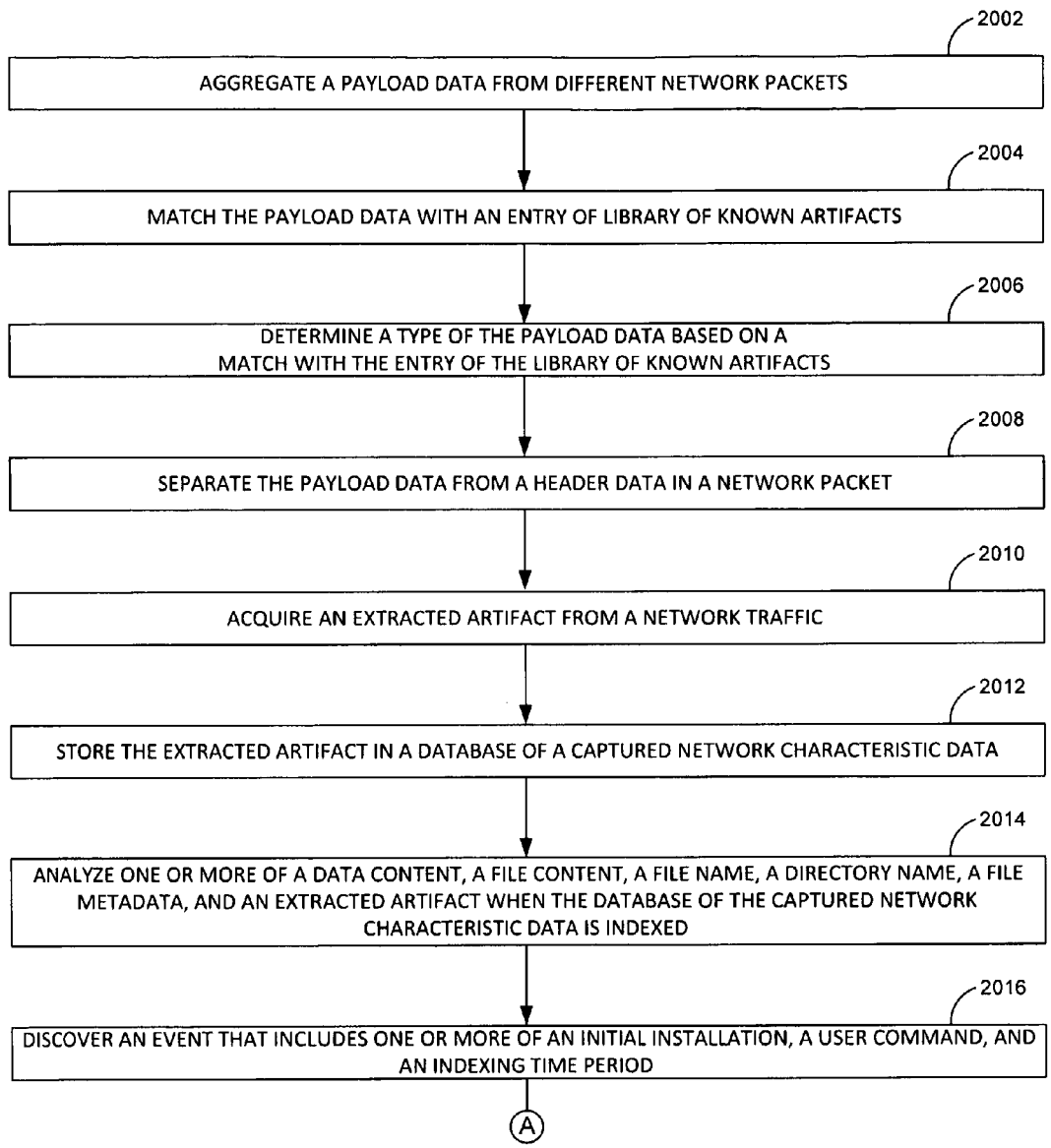
FIGS. 20A-C are process flows to index a database of a captured network characteristic data, according to one embodiment.
Figure 20B:
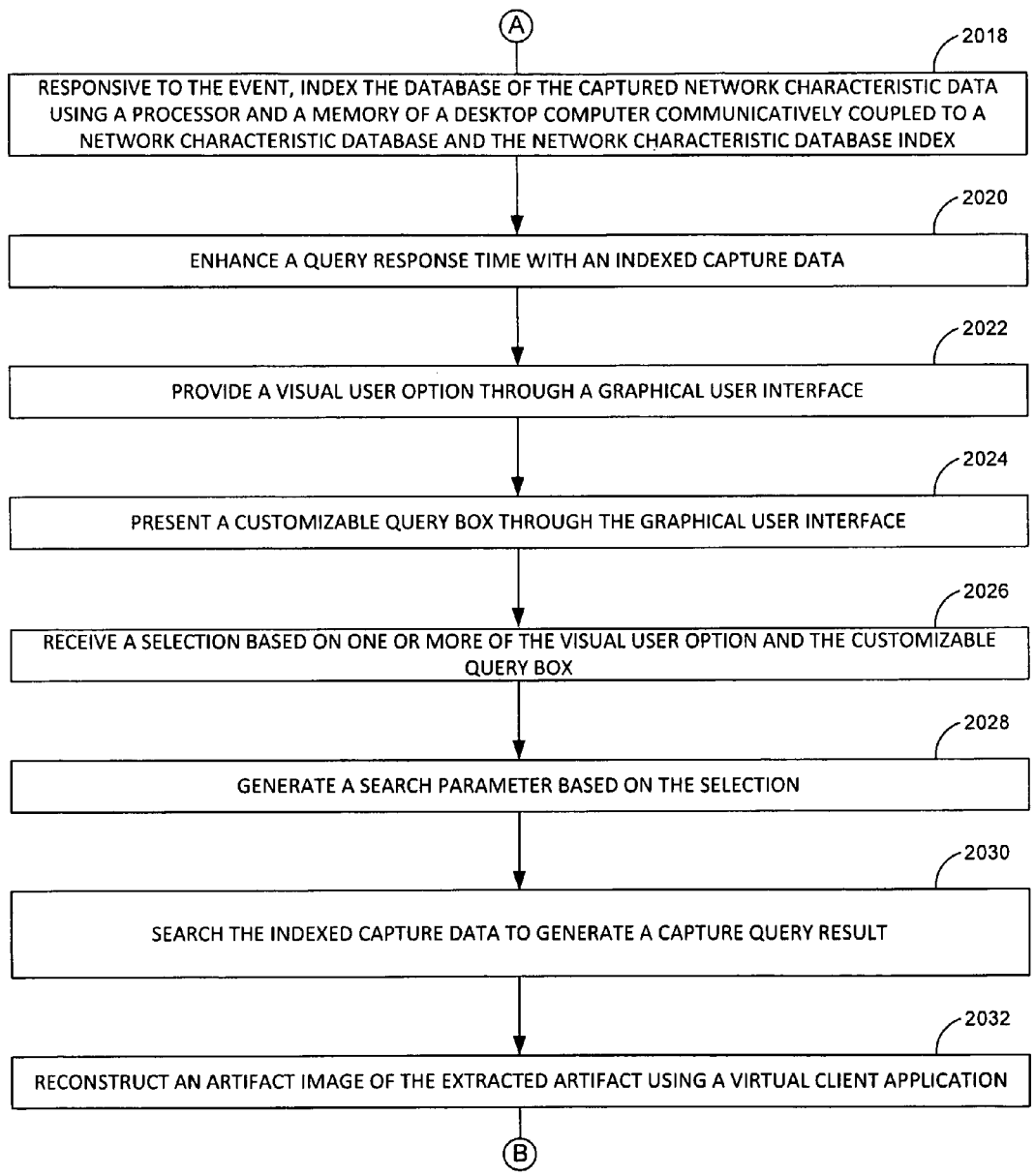
Figure 20C:
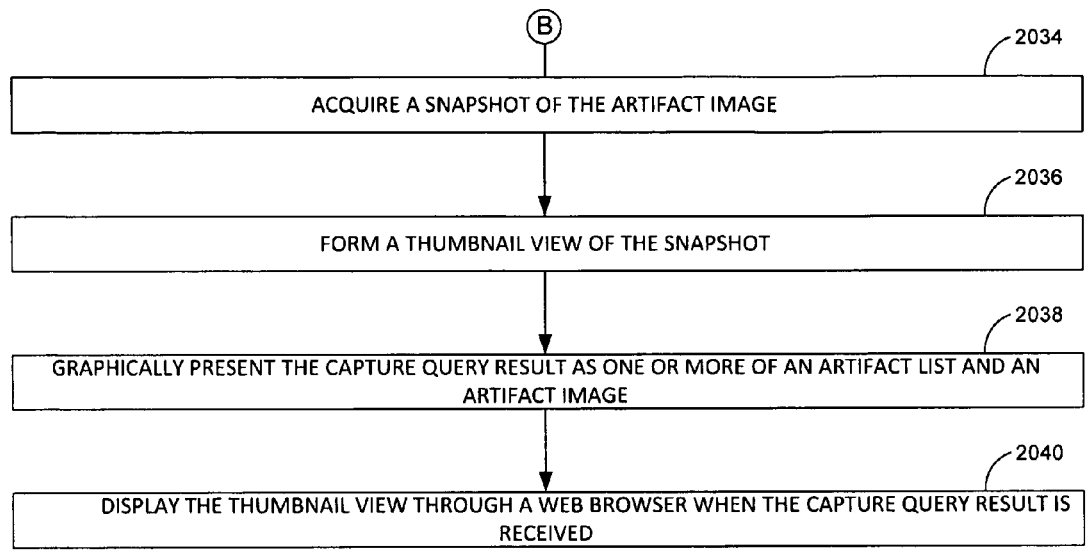

FIG. 20A-C is process flow to index a database of a captured network characteristic data, according to one embodiment. In operation 2002, a payload data is aggregated from different network packets. In operation 2004, the payload data is matched with an entry of library of known artifacts. In operation 2006, a type of the payload data is determined based on a match with the entry of the library of known artifacts. In operation 2008, the payload data is separated from a header data in a network packet. In operation 2010, an extracted artifact is acquired from a network traffic. In operation 2012, the extracted artifact is stored in a database of a captured network characteristic data. In operation 2014, one or more of a data content, a file content, a file name, a directory name, a file metadata, and an extracted artifact is analyzed when the database of the captured network characteristic data is indexed. In operation 2016, an event is discovered that includes one or more of an initial installation, a user command, and an indexing time period. The process flow of FIG. 20A continues through FIG. 20B.

In operation 2018, responsive to the event, the database of the captured network characteristic data is indexed using a processor and a memory of a desktop computer communicatively coupled to a network characteristic database and the network characteristic database index. In operation 2020, a query response time is enhanced with an indexed capture data. In operation 2022, a visual user option is provided through a graphical user interface. In operation 2024, a customizable query box is presented through the graphical user interface. In operation 2026, a selection is received based on one or more of the visual user option and the customizable query box. In operation 2028, a search parameter is generated based on the selection. In operation 2030, the indexed capture data is searched to generate a capture query result. In operation 2032, an artifact image of the extracted artifact is reconstructed using a virtual client application. The process flow of FIG. 20A and FIG. 20B continues through FIG. 20C.

In operation 2034, a snapshot of the artifact image is acquired. In operation 2036, a thumbnail view of the snapshot is formed. In operation 2038, the capture query result is graphically presented as one or more of an artifact list and an artifact image. In operation 2040, the thumbnail view is displayed through a web browser when the capture query result is received.

In an example embodiment, a dynamic database that indexes network traffic characteristics is queried. A database of an index of network traffic characteristics may be stored in a network visibility module that may be an appliance and/or a software application. The index content may include source and destination of addresses, source and destination of ports, as well as files and artifacts extracted from the network traffic.

A particular user may be allowed to query the database for a set of specific content parameters by using a graphical user interface (e.g., example user interface view of FIG. 9). It may perform this function with the field of search tools (e.g., the field module 410 of FIG. 4). This field module 410 may be a commercial desktop search module 100 such as the Google desktop software (e.g., example user interface view of FIG. 9), Microsoft's Windows desktop software and/or any other desktop search software (e.g., example user interface view of FIG. 8). The search tools and the index database may be local to the network visibility module.

A graphic user interface may be generated in a Hyper Text Markup Language (HTML) webpage (e.g., example user interface view of FIG. 7) for the user to access the resources of the index and perform a query of the index. This webpage may provide several options for the user to perform the index search in a user-centric fashion by utilizing user friendly graphical user interface elements such as check boxes, browser windows, message windows, dropdown menus, radio buttons, icons, info bars etc. (e.g., illustrative examples as found in FIG. 9). The user may build the search criteria by interacting with the graphical user interface elements and inputting query text where applicable. The graphics may be presented to the users in a way such that the user can also view the search criteria and store it so as to include the ability to later not use the graphical interface to build the same search criteria. For example, as the user selects and/or inputs information into certain graphical interface elements, the query may appear in its raw form in a particular graphical interface element.

The database of the index (e.g., network characteristic database index module 216 of FIG. 2) and/or a database index generated by the desktop search module 200 (e.g., the index module 308, the artifact index module 340 and the file index module 342 of FIG. 3) may be searched for the relevant content of the user's search. The results of this search may then be presented to the user in an intuitive format via the HTML web page (e.g., FIG. 7).

For example, John, a human resources administrator at Solera Networks may suspect that a current employee has emailed a trade secret to a competitor in a Microsoft Word document in the past two days. In an embodiment, John may query a network database of an index of network traffic for a network partially controlled by Solera Networks. The index may contain a historic database of the source and destination of email addresses transmitted on the Solera local area network (LAN). John may call up the interface HTML webpage of the embodiment and then enter a set of query parameters including the internet protocol (IP) address of the current employee and a query seeking one or more destination email addresses and any artifact attachments to the emails within the prior two days.

The desktop search module of the embodiment located on the apparatus may then generate a list of all applicable indexed data and present the data to John in a user-friendly manner. For instance, the embodiment may order the destination address chronologically with an icon indicating an appurtenant artifact. The icon may also identify the artifact as a particular application such as Microsoft Word. John may scan this list and/or open and review artifact files until the pertinent Microsoft Word document containing the trade secret is located. John may then access and review the pertinent Microsoft Word document as well as upload it onto his user computer.

Network data may be shared between a set of users (e.g., the network sharing module 230 of FIG. 2). For example, a particular user may share the results of a network data search with a set of other users without those users having also to perform a similar search. The network sharing may employ a server based network model (e.g., centralized resources where a number of servers provide the core value to a service or application.) and/or peer-to-peer based network model (e.g., a network characterized by a use of a diverse connectivity between a set of participants in a network and a cumulative bandwidth of network participants) to share data.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/ or software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

Particularly, the desktop search module 100, the network visibility module 102, the graphical user interface module 106, the index module 108, the field module 110, the network characteristic database module 114, the network characteristic database index module 116, the desktop search module 200, the network characteristic database module 214, the network characteristic database index module 216, the network sharing module 230, the graphical user interface module 306, the index module 308, the field module 310, and the artifact index module 340 of FIGS. 1-19 may be enabled using software and/or using transistors, logic gates, and electrical circuits (e.g., application specific integrated ASIC circuitry).

In addition, the file index module 342, the criteria module 344, the filter module 346, the browser generator module 348, the deskbar shortcut module 350, the quick find module 352, the the sidebar module 354, the graphical user interface module 406, the index module 408, the field module 410, the harvesting module 460, the scoring module 462, the desktop search indexing module 464, the querying module 468, the desktop search module 500, the network visibility module 502, the graphical user interface module 506, the index module 508, the network characteristic database module 514, and the network characteristic database index module 516, and the plugin module 580 of FIGS. 1-19 may be enabled using software and/or using transistors, logic gates, and electrical circuits (e.g., application specific integrated ASIC circuitry). Examples circuits may include a network visibility circuit, a desktop search circuit, a desktop search circuit, a network sharing circuit, a network characteristic database circuit, a network characteristic database index circuit, a graphical user interface circuit, a desk bar shortcut circuit, a quick find circuit, a criteria circuit, a field circuit, a filter circuit, a index circuit, a artifact index circuit, a file index circuit, a browser generator circuit, a sidebar circuit, a plugin circuit, a harvesting circuit, a scoring circuit, a desktop search indexing circuit, and a querying circuit and other circuits.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method, comprising:
indexing a database of captured network characteristic data, wherein the captured network characteristic data includes payload data and artifact characteristic data for captured network packets subject to network packet level processing, wherein the captured network packets include local area network packets and wide area network packets;
presenting a query interface that specifies parameters derived from network packet level processing;
receiving a query from the query interface, wherein the query includes specified parameters from the query interface, wherein the specified parameters include wide area network content filtering, local area network content filtering and desktop content filtering;
processing the query and the specified parameters against the database to form search results; and
supplying the search results in response to the query, wherein the search results include a wide area network search results section, a local area network search results section and a desktop search results section.

2. The method of claim 1 wherein parameters derived from network packet level processing include a user internet protocol address.

3. The method of claim 1 wherein parameters derived from network packet level processing include network transport mechanisms.

4. The method of claim 3 wherein the network transport mechanisms include HTTP sessions.

5. The method of claim 3 wherein the network transport mechanisms include FTP sessions.

6. The method of claim 1 further comprising acquiring a snapshot of an artifact image in network packets.

7. The method of claim 6 further comprising forming a thumbnail view of the snapshot.

8. The method of claim 7 further comprising providing the thumbnail view with the search results.

9. The method of claim 1 wherein the search results are organized by content type.

10. The method of claim 1 wherein the database categorizes payload data as at least one of a word processing document, a spreadsheet document, a database, an image, a video, a multimedia file, an email, an instant message communication, an audio file, a compressed file, an executable file, a web page, a presentation, a program file and a data package.

* * * * *